US011263673B2

(12) United States Patent
Nakaoka

(10) Patent No.: US 11,263,673 B2
(45) Date of Patent: Mar. 1, 2022

(54) PURCHASE INFORMATION UTILIZATION SYSTEM, PURCHASE INFORMATION UTILIZATION METHOD, AND PROGRAM

(71) Applicant: RESEARCH AND INNOVATION CO., LTD., Tokyo (JP)

(72) Inventor: Kuninobu Nakaoka, Tokyo (JP)

(73) Assignee: RESEARCH AND INNOVATION CO., LTD., Tokyo (JP)

( * ) Notice: Subject to any disclaimer, the term of this patent is extended or adjusted under 35 U.S.C. 154(b) by 0 days.

(21) Appl. No.: 16/890,769

(22) Filed: Jun. 2, 2020

(65) Prior Publication Data

US 2020/0294103 A1 Sep. 17, 2020

Related U.S. Application Data

(63) Continuation of application No. 15/124,627, filed as application No. PCT/JP2015/054455 on Feb. 18, 2015, now abandoned.

(30) Foreign Application Priority Data

Mar. 11, 2014 (JP) ................... 2014-048224

(51) Int. Cl.
*G06Q 30/02* (2012.01)
*G06Q 30/06* (2012.01)
*G06Q 40/00* (2012.01)

(52) U.S. Cl.
CPC ..... *G06Q 30/0282* (2013.01); *G06Q 30/0207* (2013.01); *G06Q 30/0251* (2013.01); *G06Q 30/06* (2013.01); *G06Q 40/12* (2013.12)

(58) Field of Classification Search
CPC .............. G06Q 30/0282; G06Q 40/12; G06Q 30/0207; G06Q 30/0251; G06Q 30/06;
(Continued)

(56) References Cited

U.S. PATENT DOCUMENTS 5,515,270 A * 5/1996 Weinblatt ............... G06Q 30/02
235/375
6,676,014 B2 * 1/2004 Catan ................... G06Q 10/087
235/375
(Continued)

FOREIGN PATENT DOCUMENTS

CN 101183455 A 5/2008
CN 102622380 A 8/2012
(Continued)

OTHER PUBLICATIONS

International Search Report issued in PCT/JP2015/054455; dated May 26, 2015.
(Continued)

*Primary Examiner* — Peter Ludwig
*Assistant Examiner* — Michael Jared Walker
(74) *Attorney, Agent, or Firm* — Studebaker & Brackett PC

(57) ABSTRACT

A purchase information utilization system according to the present invention includes a system provided with a reception unit that receives purchase information including identification information capable of identifying a product and support information which supports that the product is purchased from a terminal device of a consumer, a purchase information storage unit that stores the purchase information received by the reception unit, and a determination unit that determines whether or not the consumer has purchased the product using the support information included in the purchase information received by the reception unit.

6 Claims, 16 Drawing Sheets

Related U.S. Application Data

(60) Provisional application No. 61/992,951, filed on May 14, 2014.

(58) Field of Classification Search
CPC .......... G06Q 30/0201; G06Q 30/0267; G06Q 30/0271; G06Q 30/0278; G06Q 30/0601; G06Q 30/0633; H04M 2250/52
See application file for complete search history.

(56) References Cited

U.S. PATENT DOCUMENTS

| | | | | |
|---|---|---|---|---|
| 7,249,057 | B2* | 7/2007 | Hatakama | G06Q 30/02 705/26.61 |
| 7,334,728 | B2* | 2/2008 | Williams | G06Q 10/00 235/381 |
| 7,734,601 | B2* | 6/2010 | Weber | G06F 17/3002 707/695 |
| 7,783,515 | B1 | 8/2010 | Kumar | G06Q 10/10 705/16 |
| 7,792,709 | B1* | 9/2010 | Trandal | G06Q 30/02 705/26.1 |
| 7,840,534 | B2* | 11/2010 | Weber | G06Q 30/02 707/611 |
| 7,949,680 | B2* | 5/2011 | Yanagita | H04H 20/93 707/791 |
| 8,046,388 | B2* | 10/2011 | Yanagita | H04H 60/27 707/804 |
| 8,082,511 | B2* | 12/2011 | Sobotka | G06F 3/0482 715/745 |
| 8,315,503 | B2* | 11/2012 | Shimazaki | G11B 27/105 386/225 |
| 8,612,338 | B2* | 12/2013 | Kishi | G06Q 30/02 705/38 |
| 8,687,891 | B2* | 4/2014 | Takacs | G06K 9/4642 382/190 |
| 8,740,085 | B2* | 6/2014 | Furlong | G06K 7/1095 235/435 |
| 9,407,975 | B2* | 8/2016 | Grusd | H04N 21/8583 |
| 9,792,596 | B2* | 10/2017 | Craft | G06Q 20/045 |
| 2001/0018666 | A1* | 8/2001 | Sugiyama | G06Q 20/202 705/14.14 |
| 2002/0091569 | A1* | 7/2002 | Kitaura | G06Q 30/02 705/14.26 |
| 2002/0138346 | A1* | 9/2002 | Kodaka | G06Q 30/02 705/14.35 |
| 2002/0143643 | A1* | 10/2002 | Catan | G06Q 10/087 235/375 |
| 2002/0143651 | A1* | 10/2002 | Kishi | G06Q 30/02 705/27.1 |
| 2003/0099459 | A1* | 5/2003 | Yanagita | G11B 27/031 386/214 |
| 2004/0112236 | A1* | 6/2004 | Yokoyama | B42D 15/00 101/483 |
| 2004/0186779 | A1* | 9/2004 | Yamamichi | G06Q 30/02 705/14.23 |
| 2006/0116881 | A1* | 6/2006 | Umezawa | G06Q 10/107 704/270 |
| 2006/0293948 | A1* | 12/2006 | Weinblatt | G06Q 30/02 705/14.25 |
| 2007/0038516 | A1* | 2/2007 | Apple | G06Q 30/02 705/14.42 |
| 2007/0182801 | A1* | 8/2007 | Shoji | G06K 1/121 347/104 |
| 2008/0052159 | A1* | 2/2008 | Balakrishnan | G06Q 30/016 705/14.36 |
| 2008/0065485 | A1* | 3/2008 | Hammond | G06Q 30/0239 705/14.25 |
| 2008/0142599 | A1* | 6/2008 | Benillouche | G06Q 30/02 235/462.41 |
| 2008/0196060 | A1* | 8/2008 | Varghese | H04N 7/16 725/34 |
| 2008/0244067 | A1* | 10/2008 | Ushiyama | H04L 41/5054 709/224 |
| 2008/0259208 | A1* | 10/2008 | Yanagita | H04H 60/48 348/461 |
| 2009/0018895 | A1* | 1/2009 | Weinblatt | G06Q 30/02 705/7.29 |
| 2009/0271265 | A1* | 10/2009 | Lay | G06Q 20/0453 705/14.38 |
| 2010/0306080 | A1* | 12/2010 | Trandal | G06Q 10/10 705/26.8 |
| 2011/0125561 | A1* | 5/2011 | Marcus | G06Q 20/32 705/14.15 |
| 2011/0225031 | A1* | 9/2011 | Park | G06Q 30/02 705/14.25 |
| 2011/0282734 | A1* | 11/2011 | Zurada | G06Q 30/02 705/14.49 |
| 2012/0030032 | A1* | 2/2012 | Zurada | G06Q 50/01 705/14.66 |
| 2012/0048922 | A1* | 3/2012 | Godager | G06Q 30/00 235/379 |
| 2012/0078682 | A1* | 3/2012 | Pinsley | G06Q 30/0201 705/7.29 |
| 2012/0084135 | A1* | 4/2012 | Nissan | G06Q 30/0238 705/14.38 |
| 2012/0265800 | A1* | 10/2012 | Tuchman | H04M 3/51 709/203 |
| 2012/0303525 | A1* | 11/2012 | Sahadevan | G06Q 20/405 705/44 |
| 2012/0323663 | A1* | 12/2012 | Leach | G06Q 30/0239 705/14.25 |
| 2013/0024282 | A1* | 1/2013 | Kansal | G06Q 30/01 705/14.53 |
| 2013/0046648 | A1* | 2/2013 | Caiman | G06Q 30/08 705/26.3 |
| 2013/0066771 | A1* | 3/2013 | Ciurea | G06Q 30/0201 705/39 |
| 2013/0110652 | A1* | 5/2013 | Herring | G06Q 50/188 705/16 |
| 2013/0110678 | A1* | 5/2013 | Vigier | G06Q 30/06 705/26.61 |
| 2013/0198361 | A1* | 8/2013 | Matsuzaki | H04L 41/50 709/223 |
| 2013/0211899 | A1* | 8/2013 | Nagpal | G06Q 30/0257 705/14.25 |
| 2013/0290234 | A1* | 10/2013 | Harris | G06N 5/022 706/46 |
| 2013/0332228 | A1* | 12/2013 | Lim | G06Q 30/0641 705/7.29 |
| 2014/0006198 | A1* | 1/2014 | Daly | G06Q 30/06 705/24 |
| 2014/0046760 | A1* | 2/2014 | Keogh | G06Q 30/02 705/14.53 |

FOREIGN PATENT DOCUMENTS

| | | | |
|---|---|---|---|
| JP | 2002-373239 A | 12/2002 | |
| JP | 2003-281312 A | 10/2003 | |
| JP | 2006-048137 A | 2/2006 | |
| JP | 2007-141051 A | 6/2007 | |
| JP | 2009-070021 A | 4/2009 | |
| JP | 2012-141842 A | 7/2012 | |
| JP | 2014-006596 A | 1/2014 | |
| KR | 10-2002-0045626 A | 6/2002 | |
| KR | 10-2007-0019923 A | 2/2007 | |
| KR | 10-2009-0004402 A | 1/2009 | |
| KR | 10-2010-0101423 A | 9/2010 | |
| WO | WO-2005059853 A1 * | 6/2005 | .............. G07G 5/00 |
| WO | 2007/130688 A2 | 11/2007 | |

OTHER PUBLICATIONS

Genkin Shishutsu Ginko Koza Konyu Rireki Net to Sumaho de Kakei Kanri Mittsu no Service o Hikaku! Jibun Gonomi no Service o Saguru Financial Planner ga Oshieru Kakeibo no Yomikata

(56) References Cited

OTHER PUBLICATIONS

Ikashikata, Nikkei Personal Computing, Nikkei Business Publications, Inc., Oct. 28, 2013 (Oct. 28, 2013), No. 684, pp. 50 to 59.

* cited by examiner

Fig. 5

| PURCHASE INFORMATION ID | CONSUMER IDENTIFIER | CODE ID | RECEIPT ID | IMAGE ID | COMMENT | EVALUATION |
|---|---|---|---|---|---|---|
| b001 | u001 | C0013,C0036 | R0011 | Im046 | ×××× | 3 |
| b002 | u002 | C0111 | R0001 | Im003 | ... | 4.5 |
| ... | ... | ... | ... | ... | ... | ... |

PURCHASE INFORMATION UTILIZATION SYSTEM, PURCHASE INFORMATION UTILIZATION METHOD, AND PROGRAM

CROSS-REFERENCE TO RELATED APPLICATIONS

This application is a Continuation of U.S. patent application Ser. No. 15/124,627 filed on Sep. 8, 2016, which is the U.S. National Stage of International Application No. PCT/JP2015/054455 filed Feb. 18, 2015, which claims benefit of priority to U.S. Provisional Application 61/992,951 filed on May 14, 2014 and Japanese Patent Application No. 2014-048224 filed on Mar. 11, 2014, the entire contents of which are incorporated herein by reference.

TECHNICAL FIELD

The present invention relates to a purchase information utilization system, a purchase information utilization method, and a program or the like.

BACKGROUND ART

Conventionally, WEB questionnaires utilizing the Internet or the like have been conducted. For example, Patent Literature 1 discloses a questionnaire system which allows a user (consumer) to instantaneously respond through a portable telephone, a personal digital assistant apparatus or a personal computer or the like connectable to the Internet by attaching a questionnaire access code to a product and a product package of a service provider (company/shop) or the like. Also, conventionally, advertisements are presented by predicting optimal consumers for a product of a service providing company on the Internet. For example, a system is disclosed in which, by linking product identification display of a product and a product package of a service provider (company/shop) with advertisements, the advertisements assumed to be most appropriate for a user are displayed at a timing considered as being optimal by the service provider through a portable telephone, a portable information terminal apparatus or a personal computer or the like connectable to the Internet by the user (consumer), when the user purchases the product.

CITATION LIST

Patent Literature

[Patent Literature 1]
Japanese Patent Laid-Open No. 2002-373239

SUMMARY OF INVENTION

Technical Problem

However, in the system described in Patent Literature 1, there is no means of confirming whether a consumer who responds to a questionnaire has actually purchased and used the product and the questionnaire is not answered in real time so that there is a problem that answers are unreliable and a highly accurate market research cannot be conducted. In addition, since it cannot be confirmed that a user has purchased the product, there is a problem that the advertisement is not always displayed at the timing considered as being optimal by a service provider.

Therefore, in consideration of the above-described circumstances, an object of the present invention is to provide a purchase information utilization system, a purchase information utilization method and a program capable of collecting highly reliable purchase data from consumers who have actually purchased products and appropriately utilizing the purchase data.

Solution to Problem

A purchase information utilization system according to the present invention includes a system provided with a reception unit that receives purchase information including identification information capable of identifying a product and support information which supports that the product is purchased from a terminal device of a consumer, a purchase information storage unit that stores the purchase information received by the reception unit, and a determination unit that determines that the consumer has purchased the product using the support information included in the purchase information received by the reception unit.

The support information may include an image of a receipt when the product is purchased.

In addition, the support information may include a photographed image of the product.

Also, the purchase information utilization system may further include transmission means that transmits, when the determination unit determines that the consumer has purchased the product, predetermined content corresponding to the product to the terminal device of the consumer.

In addition, the purchase information utilization system may further include addition means that, when the reception unit receives information such as an image related to the product, a comment on the product, or an evaluation of the product from the terminal device of the consumer, adds the received information to the purchase information of the product by the consumer stored in the purchase information storage unit, and stores the received information.

In addition, the purchase information utilization system may further include provision means that receives the identification information from the terminal device of the consumer, and provides the terminal device of the consumer with sales promotion information corresponding to the received identification information.

The sales promotion information may be prepared based on information stored in the purchase information storage unit.

A purchase information utilization method according to the present invention includes a method executed by a computer, the method including a step of receiving purchase information including identification information capable of identifying a product and support information which supports that the product is purchased from a terminal device of a consumer, a step of storing the purchase information received by the receiving step, and a step of determining that the consumer has purchased the product using the support information included in the purchase information received by the receiving step.

In addition, a program according to the present invention includes a program that makes a computer function as means for receiving purchase information including identification information capable of identifying a product and support information which supports that the product is purchased from a terminal device of a consumer, purchase information storing means for storing the purchase information received by the receiving means, and means for determining that the consumer has purchased the product using the support information included in the purchase information received by the receiving means.

"System" includes a system that is configured from an information processor or the like and is for providing a user with a specific function. For example, the system is, but not exclusively, configured from a server device, the one of a cloud computing form, an ASP (Application Service Provider), the one of a client server model, or the like.

In addition, the program of the present invention can be installed or loaded to a computer by downloading the program through various kinds of recording media such as an optical disk like a CD-ROM, a magnetic disk or a semiconductor memory, or through a communication network or the like.

In addition, in the present description or the like, "unit" does not only mean a physical configuration and also includes a case of achieving a function that the configuration has by software. In addition, the function that one configuration has may be achieved by two or more physical configurations, and the function of two or more configurations may be achieved by one physical configuration.

Advantageous Effects of Invention

According to the present invention, highly reliable purchase data can be collected from consumers who have actually purchased products. As a result, an accurate survey and promotion can be executed.

BRIEF DESCRIPTION OF DRAWINGS

FIG. 5 is a diagram illustrating a purchase information table in the first embodiment of the present invention.

FIG. 11 is a diagram illustrating one example of a word-of-mouth/review screen in the second embodiment of the present invention.

FIG. 15 is a diagram illustrating one example of a purchase calendar in the fourth embodiment of the present invention.

DESCRIPTION OF EMBODIMENTS

First Embodiment

Hereinafter, one of embodiments of the present invention will be described in detail. Note that the following embodiment is an example for describing the present invention and is not intended to limit the present invention to the embodiment only. In addition, the present invention can be variously modified without deviating from the gist. Further, those skilled in art can adopt an embodiment in which individual elements described below are replaced with equivalent ones, and the embodiment is also included in the scope of the present invention. Furthermore, positional relations such as up and down and right and left illustrated as needed are based on display illustrated in the figures unless otherwise mentioned. Further, various kinds of dimensional ratios in the figures are not limited to the ratios illustrated in the figures.

Figure 1:
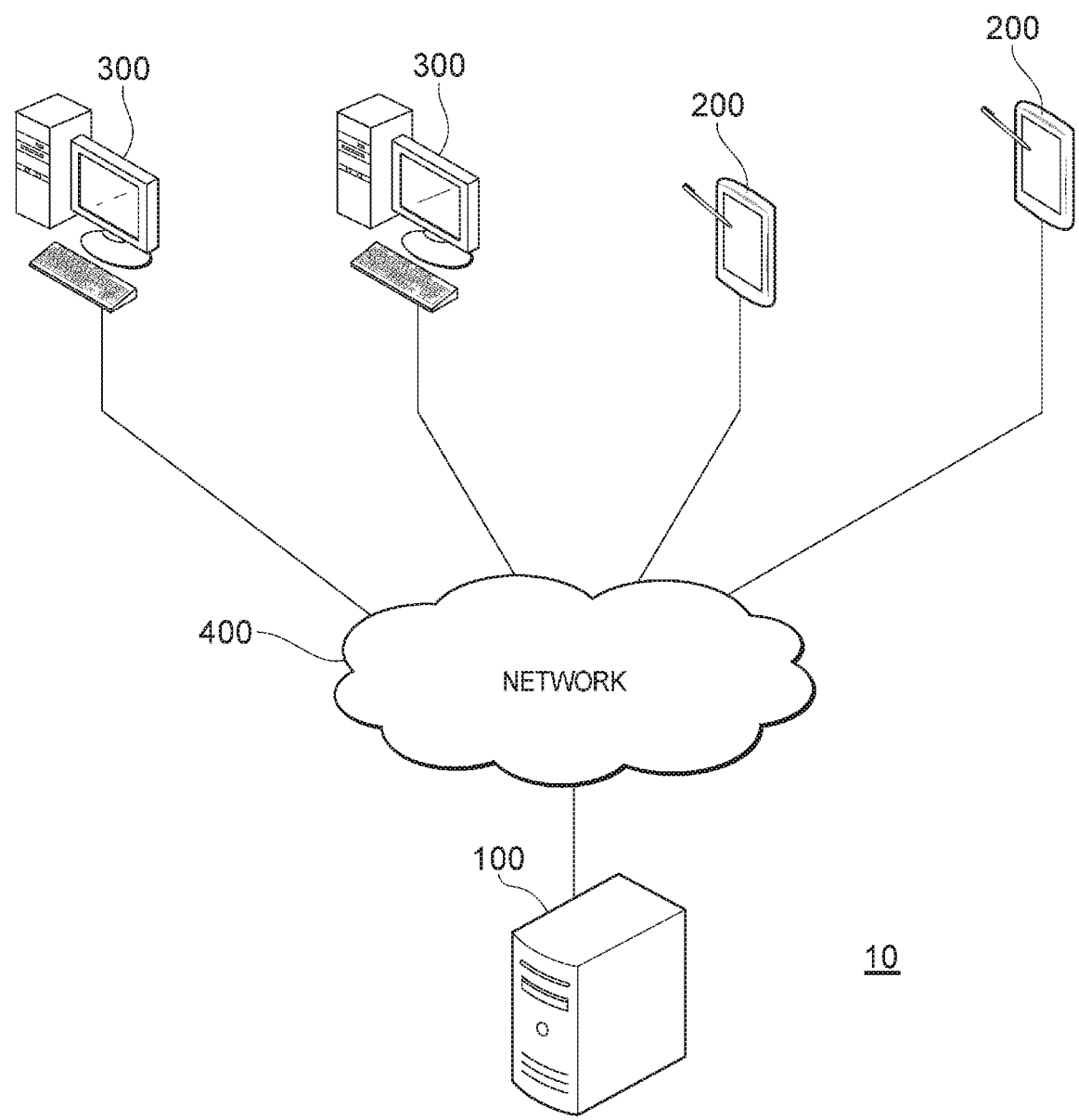
FIG. 1 is a configuration diagram of a purchase information utilization system in a first embodiment of the present invention.

FIG. 1 illustrates a system configuration diagram of a purchase information utilization system 10 relating to the present embodiment. As illustrated in FIG. 1, the purchase information utilization system 10 includes a server device 100, consumer terminals 200 and company terminals 300. The server device 100 is a computer for a server connected to a network 400 such as the Internet or an exclusive line. In addition, by mutually communicably setting the consumer terminals 200 and the company terminals 300 which are terminal devices connected by cables or by radio to the network 400 similarly to the server device 100, the purchase information utilization system 10 is configured. Note that, in the present embodiment, the purchase information utilization system 10 is described as the one including the server device 100, the consumer terminals 200 and the company terminals 300, however, it is not limited thereto. For example, the purchase information utilization system 10 may be configured as a system of a cloud computing form. In this case, a user utilizes computer processing of the purchase information utilization system 10 through a network as a service. Also, the purchase information utilization system 10 may be configured as a system including a server of an ASP. Note that, in the present embodiment, as one example, a user who is a supplier who provides products or the like and surveys evaluations of the products or the like by utilizing the purchase information utilization system 10 is a user (hereinafter, the user is also referred to as a company), and a user who purchases the products or the like and registers purchase information and the evaluations of the products to the purchase information utilization system 10 is referred to as a consumer. In addition, the description is given assuming that the user utilizes the purchase information utilization system 10 using the company terminal 300 and the consumer utilizes the purchase information utilization system 10 using the consumer terminal 200.

The consumer terminal 200 is an information processor provided with a function of communicating with the server device 100 through the network 400. Specifically but not exclusively, examples include portable telephones, smart phones, PCs (Personal Computers), PDAs (Personal Digital Assistants), tablets, wearable terminals and the like. Though not illustrated in FIG. 1, it is preferable that the consumer terminal 200 includes a control unit including a processor and a memory, a communication unit for connection with the network 400, an input unit such as a touch panel to receive an operation from the user, a photographing unit for taking a photograph, and a display unit such as a display, however, it is not required to include all of these.

Also, the company terminal 300 is an information processor provided with a function of communicating with the server device 100 through the network 400, similarly to the consumer terminal 200. Specifically but not exclusively, examples are a portable telephone, a smart phone, a PC, a PDA, a tablet, a wearable terminal or the like. Though not illustrated in FIG. 1, it is preferable that the company terminal 300 includes a control unit including a processor and a memory, a communication unit for connection with the network 400, an input unit such as a keyboard or a mouse to receive an operation from the user, and a display unit such as a display, however, it is not required to include all of these.

Figure 2:
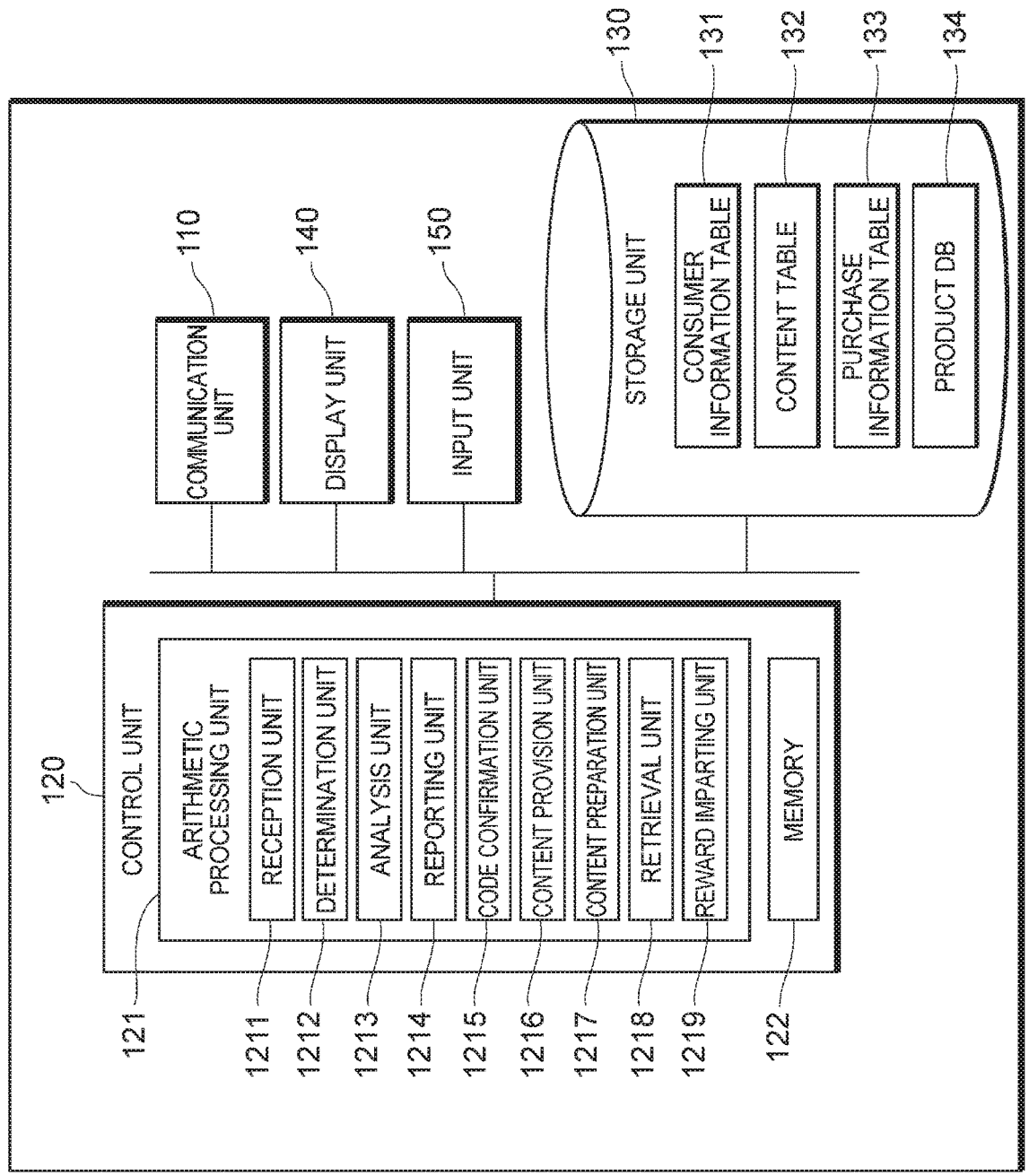
FIG. 2 is a block diagram of a server device in the first embodiment of the present invention.

Next, using FIG. 2, individual configurations of the server device 100 for achieving such a purchase information utilization system 10 will be described. FIG. 2 is a block diagram of the server device 100. As illustrated in FIG. 2, the server device 100 includes a control unit 120, an input unit 150, a storage unit 130, and a communication unit 110.

The control unit 120 includes an arithmetic processing unit 121 such as a CPU or an MPU, a memory 122 such as a RAM, and an image processing unit (not shown in the figure). The arithmetic processing unit 121 operates various kinds of functional units by executing a program stored in the storage unit 130 based on various kinds of input. The program may be the one that is stored in a recording medium such as a CD-ROM or distributed through the network 400 and installed to a computer. The memory 122 is for temporarily storing the program for the server, a game program, and various kinds of data needed for an arithmetic operation or the like during execution of processing in these programs.

The input unit 150 is configured to receive an operation from a manager of the server device 100, and can be achieved by a keyboard, a mouse, a touch panel or the like.

The storage unit 130 is configured by a storage device such as a hard disk, and records various kinds of programs needed for the execution of the processing in the control unit 120 and data needed for the execution of the various kinds of programs or the like. In the storage unit 130, further, a consumer information table 131, a content table 132, a purchase information table 133, and a product DB 134 are preserved.

Figure 3:
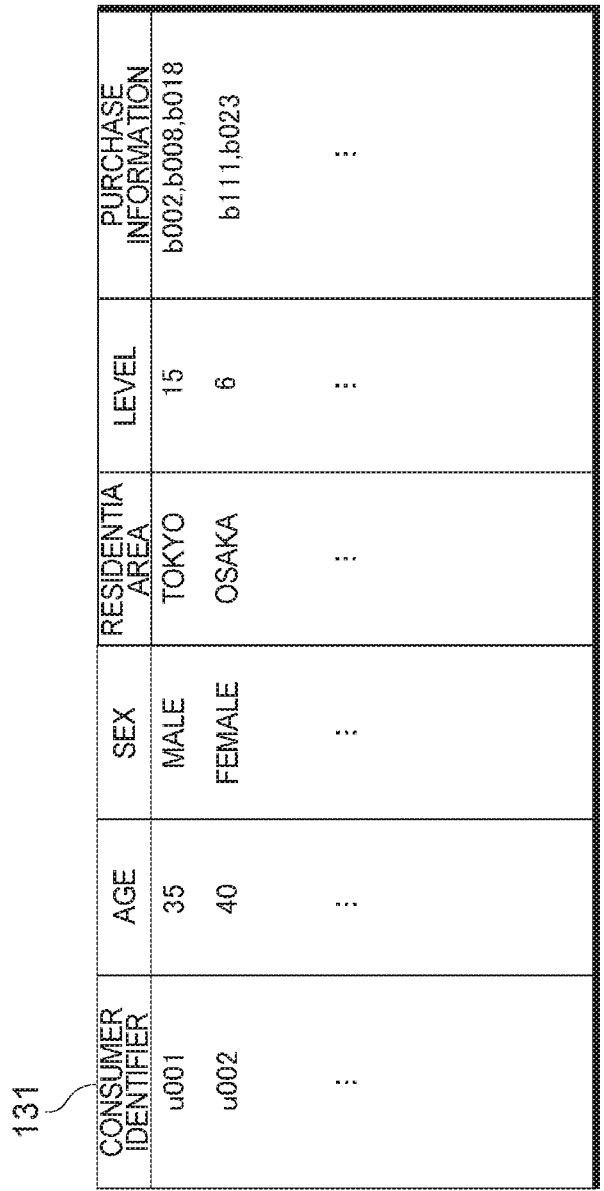
FIG. 3 is a diagram illustrating a consumer information table in the first embodiment of the present invention.
Figure 4:
FIG. 4 is a diagram illustrating a content table in the first embodiment of the present invention.

FIG. 3 is a diagram illustrating the consumer information table 131, FIG. 4 is a diagram illustrating the content table 132, and FIG. 5 is a diagram illustrating the purchase information table 133. In the consumer information table 131, as illustrated in FIG. 3, consumer information such as a consumer identifier, an age, sex, an occupation, an address, a level, and an issued evaluation request is stored. It is desirable that the consumer information is inputted when the consumer registers with the purchase information utilization system 10. Though not illustrated in the figure, as the consumer information, the consumer may register a date of birth, an address, an occupation, a marital history, a family structure, family living together, an annual income, and an annual household income or the like in addition to the purchase information utilization system 10.

In addition, as illustrated in FIG. 4, in the content table 132, a content ID, a product ID related to content, the content, and a content issuance condition are stored in correspondence. The content includes an evaluation request for the product, a questionnaire, a coupon of the product, an advertisement, a request of a monitoring investigation or the like. The evaluation request may be the one that requests the consumer who has purchased the product to input a satisfaction degree of the product by a numerical value, for example. Also, the questionnaire may request a comment on the product and an answer to a question. The advertisement may be related to a flanked product or a related product of the product. Further, the coupon may be instantaneously usable when the product is purchased or may be usable when the same product is to be purchased next time or thereafter.

The content is transmitted to the consumer terminal according to the issuance condition. The issuance condition includes a condition of the consumer to be an issuance target and an issuance timing. Examples of the condition of the consumer are all the information collected by the purchase information utilization system 10, such as the age, occupation, address and level of the consumer, information related to the purchase stored in the purchase information table 133 to be described later, and evaluation information. For the issuance timing, for example, as the number of days from the time of product purchase, the number of days from the time when the consumer reads a product code or transmits a product image (shopping scene image) may be determined, and as the number of days from the time of product use, the number of days from the time when the consumer transmits a using scene image may be determined. In addition, the user can prepare the content and registers it in the storage unit 130 from the company terminal 300.

In the purchase information table 133, the purchase information which is the information related to the purchase that the consumer has actually made is stored. As illustrated in FIG. 5, in the purchase information table 133, a product code such as a bar code or a JAN code which is identification information of the product photographed by the consumer, receipt information extracted from a receipt image photographed by the consumer, and a shopping scene image photographed by the consumer are stored. While the receipt image and the shopping scene image are used as information for supporting that the product is purchased in the present embodiment, other information may be utilized. The receipt information is the information for which text data is read from the image of a receipt when the product is purchased in the present embodiment. The shopping scene image indicates the image of the purchased product. In addition, the information of the consumer who has purchased the product and position information of the consumer when the purchase information is registered can be also linked with the product code and stored as the purchase information.

Further, in the purchase information table 133, an image of a scene of using the purchased product (using scene image) and evaluation information which is the information of the evaluation related to use of the purchased product by the consumer are linked with the product code and stored. The evaluation information includes a satisfaction degree, an impression, a comment or the like for the purchased product, for example. It is desirable that the product and the consumer using the product are photographed in the using scene image. By having the consumer register the using scene as the purchase information, the user can recognize "a using method" and "an actual using situation" of the product. In addition, in the purchase information table 133, a consumer's comment on the product and a questionnaire from the company to the consumer or the like can be also registered.

In addition, in the product DB 134, the product code and the product corresponding to the product code are linked and stored. Note that the product DB 134 may be possessed by an external system of the purchase information utilization system 10.

Returning to FIG. 2, the configuration of the server device 100 will be subsequently described.

The communication unit 110 is configured so as to connect the server device 100 to the network 400. For example, the server device 100 can be achieved from a LAN card, an analog modem, an ISDN mode or the like, and an interface for connecting these with the processing unit through a transmission line such as a system bus.

Further, as illustrated in FIG. 2, the arithmetic processing unit 121 includes, as functional units, a reception unit 1211, a determination unit 1212, an analysis unit 1213, a reporting unit 1214, a code confirmation unit 1215, a content provision unit 1216, a content preparation unit 1217, a retrieval unit 1218, a reward imparting unit 1219, and a sales promotion information provision unit 1220.

The reception unit 1211 receives, from the consumer terminal 200, the product code read by the consumer, and as the support information, a photographed receipt image and the image of the product purchased by the consumer or the shopping scene image of the product. The reception unit 1211 registers the received product code and receipt information extracted from the receipt image which is the support information and the shopping scene image to the purchase information table 133 in correspondence as the purchase information. The reception unit 1211 can also register the receipt image to the purchase information table 133 as the purchase information in linkage with the product code. Further, when the using scene image, and the evaluation information which is the information including the comment on the product and the evaluation for which the satisfaction degree is digitized or the like are received from the consumer terminal 200, it is desirable to also register these pieces of information to the purchase information table 133 corresponding to the product code.

When the reception unit 1211 receives the identification information, the receipt image or the receipt information which is the support information and the shopping scene image, the determination unit 1212 determines that the consumer has purchased the product. When the reception unit 1211 does not receive one of the identification information, the receipt information and the shopping scene image, the determination unit 1212 determines that the consumer has not actually purchased the product, and may not register the purchase information.

By extracting and analyzing the receipt information which is text data of the receipt from the received receipt image, the analysis unit 1213 may collect the information of the purchase related to the receipt. For example, the analysis unit 1213 may analyze whether or not a kind of the product written on the receipt and a kind of the received product code coincide. In addition, the analysis unit 1213 may analyze a shop and the time at which the receipt is issued, the number of the products written on the receipt, and a total money amount, etc. The analysis unit 1213 can store these pieces of analyzed information in the purchase information table 133 in linkage with the product code further.

Further, the analysis unit 1213 may estimate specific product identification information based on the read receipt information, using a correspondence relation between the receipt information registered in the storage unit 130 and the product code. Specifically, by repeatedly matching a product name extracted from the receipt information and the product specified from the product code, the product is analogized from the receipt information. A function of analyzing the receipt information of the analysis unit 1213 can be also provided in the consumer terminal 200.

The reporting unit 1214 can receive a report from other consumers when the consumer registers false purchase information. Specifically, the consumers are classified into groups of several people each by the arithmetic processing unit 121 when registered as members in the purchase information utilization system 10, and group IDs are allocated. The group ID may be periodically changed. Then, when a certain consumer registers the purchase information, the arithmetic processing unit 121 transmits the purchase information to the consumers having the same group ID as the consumer. When incorrect purchase information is registered such as the case that it is registered that several hundreds of expensive products are simultaneously purchased, for example, the consumers who receive the purchase information can notify the reporting unit 1214 of the incorrect purchase information. Based on the notice, the reporting unit 1214 can determine whether or not it is incorrect purchase. For example, when there are a fixed number or more of notices for the same purchase information, the reporting unit 1214 can consider it as the incorrect purchase. In addition, without performing grouping, the arithmetic processing unit 121 may transmit the purchase information registered by the consumer to the other consumers at random.

The code confirmation unit 1215 refers to the product DB 134, and specifies the product corresponding to the product code on the basis of the product code received by the reception unit 1211.

The content provision unit 1216 refers to the content table 132 to see whether or not the content such as the evaluation request, the questionnaire and the coupon is registered for the specified product. In the case that the content is registered in the content table 132 for the product corresponding to the product code, the condition of the consumer is referred to from the issuance condition registered in linkage with the content, and whether or not the consumer who has transmitted the product code is pertinent to the condition is determined. In the case that the consumer who has transmitted the product code is pertinent to the condition of the consumer linked with the content, based on the issuance timing, the content provision unit 1216 transmits the content to the consumer terminal 200. The issuance timing may be the time when the reception unit 1211 receives the product code or the time when the reception unit 1211 receives the image of the product.

The content preparation unit 1217 can receive preparation of new content from the user and register it to the server device 100. The user can prepare the content by specifying a name of the content, issuance content for which the product to be a purchase target, the evaluation request that the user wants the consumer to perform for the purchased product, the questionnaire and the coupon or the like are recorded, and the condition of the consumer to be a target to transmit the content. The prepared content is preserved in the content table 132 of the server device 100.

The retrieval unit 1218 receives a purchase information retrieval request from the company terminal 300 through the communication unit 110, and retrieves a pertinent record from the purchase information table 133 based on the condition specified from the user. Specifically, the retrieval unit 1218 can narrow down the purchase information with product information and consumer information specified by the user as retrieval conditions.

In addition, the reward imparting unit 1219 imparts rewards to the consumer who has registered the purchase information included in a result of retrieval conducted based on the retrieval request and the consumer to whom the user has transmitted the evaluation request or the questionnaire and who has responded to it. Also, the reward imparting unit 1219 can impart the rewards when the consumer registers the product code, the receipt image and the shopping scene image. Examples of the rewards are points that can be exchanged with predetermined products, coupons, electronic money and travel tickets or the like. The rewards to be imparted may be determined according to the level of the consumer or the contents of the comment. For example, the consumer may be able to apply for the one that consumer wants from prizes provided from the purchase information utilization system 10 by saving points. At the time, the reward imparting unit 1219 can also determine the prize that the consumer can apply for according to the level of the consumer.

In addition, for example, the user can evaluate the comment of the consumer, and the reward imparting unit 1219 can impart the reward according to the evaluation. Thus, consumer's motivation to evaluate the product can be increased. Also, the reward imparting unit 1219 may charge a retrieval fee to the user when the user requests the retrieval, and pay part of the charged retrieval fee to the consumer as the reward. The reward to be paid at the time may be a money amount for which the retrieval fee is divided by the number of the consumers pertinent to the retrieval condition.

When the consumer reads the product code in the consumer terminal 200, the sales promotion information provision unit 1220 provides the consumer terminal 200 with sales promotion information. The provided sales promotion information is displayed at the consumer terminal. It is desirable that the sales promotion information is the information obtained as a result of analyzing/editing many pieces of the purchase information stored in the purchase information table 133. For example, it is an average value of the satisfaction degrees for the product or the impressions/comments or the like for the product from the consumers of a certain generation living in a certain region. Thus, the consumer who is to purchase the product can determine whether or not to purchase the product based on the actual evaluation for the product by the other consumers. In addition, for example, the sales promotion information provision unit 1220 may provide information of a shop handling the same product cheaper or provide a well-selling ranking of the products of the same category as the sales promotion information. The sales promotion information provision unit 1220 can provide these pieces of information also from the purchase information stored in the purchase information table 133. For example, the sales promotion information provision unit 1220 can provide the information of the cheaper shop by comparing the money amounts of the product analyzed and registered by the analysis unit 1213. Also, by retrieving the purchase information of the product purchased most recently from the purchase information table 133, the well-selling ranking can be provided. Further, the sales promotion information provision unit 1220 may display advertisement coupons of rival products or the like without using the information stored in the purchase information table 133.

Figure 6:
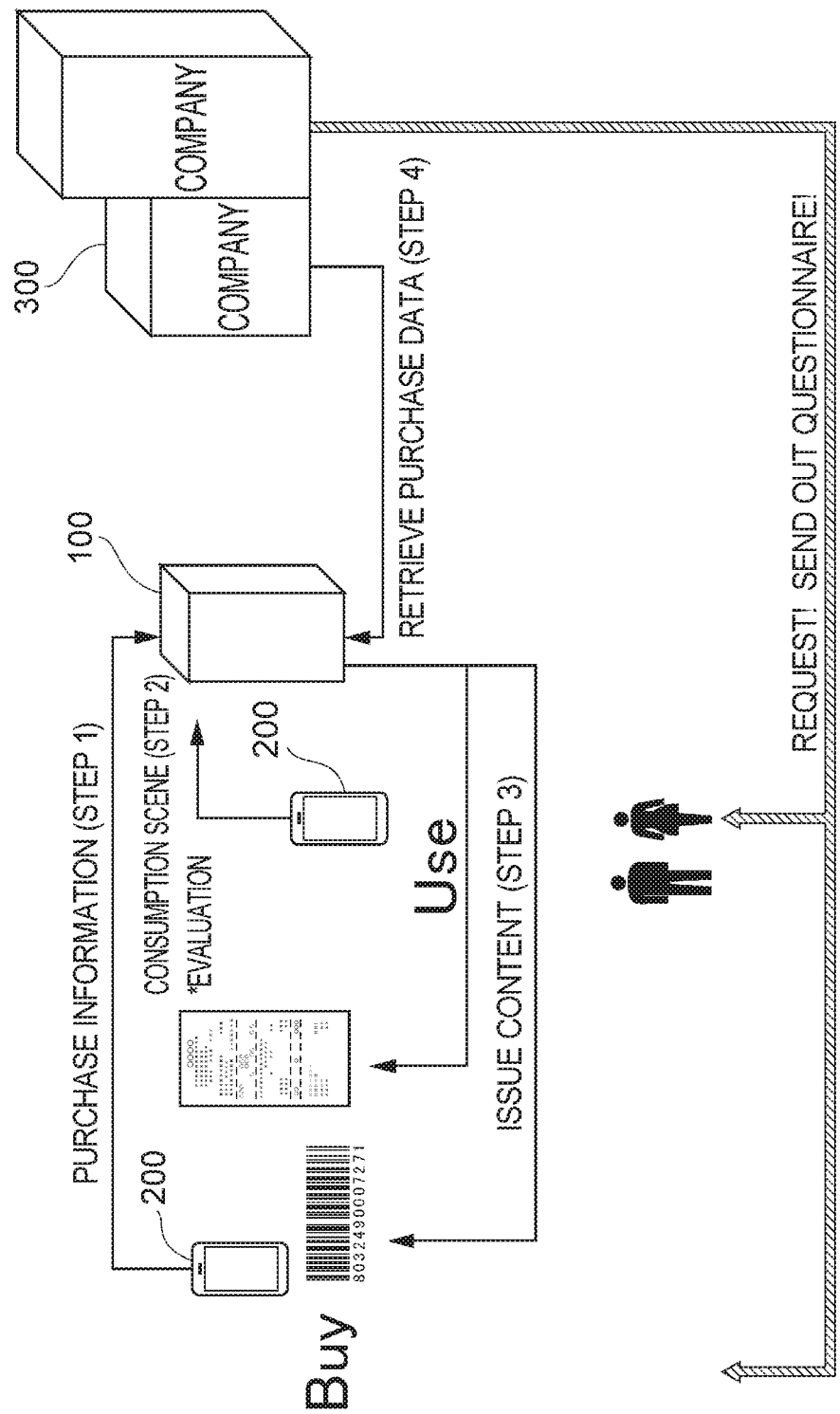
FIG. 6 is a diagram illustrating an outline of processing of the purchase information utilization system in the first embodiment of the present invention.

Next, an outline of processing of the purchase information utilization system 10 will be described using FIG. 6. Here, as one example, a case that the user retrieves and utilizes the purchase information of the consumer in the purchase information utilization system 10 will be described.

The consumer registers with the purchase information utilization system 10 as a member beforehand. Upon the member registration, the consumer registers the consumer information such as an age, sex, an occupation and an address. The consumer information registered by the consumer is registered in the consumer information table 131.

The consumer who becomes a member of the purchase information utilization system 10 registers the purchase information including the identification information capable of identifying the purchased product and the information that supports that the product is purchased to the server device 100 after shopping or the like, for example. In the present embodiment, the product code such as a JAN code displayed on the purchased product is photographed in the photographing unit of the consumer terminal 200 as the identification information, and the receipt when the product is purchased and the purchased product itself are photographed respectively as the information to support the purchase, and they are transmitted to the server device 100. The server device 100 receives and registers them (STEP 1). At the time, it is preferable that, in addition to the three images described above, a member ID of the consumer is transmitted from the consumer terminal 200 to the server device 100. At the time, in the server device 100, the three images of the product code, the receipt and the product and the member ID are linked and managed in the purchase information table 133 as the purchase information related to the product.

In addition, the consumer can also transmit the image for which a using scene of using the purchased product is photographed in the photographing unit of the consumer terminal 200 when actually using the purchased product or the like, and register it in the server device 100 (STEP 2). Further, the consumer can also register the evaluation for the purchased product. Here, the contents of the evaluation may include the satisfaction degree and comment or the like for the product.

Note that registration of the consumer may be urged by imparting points to the consumer who registers the purchase information and the using scene of the product. In such a manner, by the consumer independently registering the purchase information to the server device 100, many pieces of the purchase information are stored with the lapse of time in the server device 100.

On the other hand, the user can register the content in the server device 100 beforehand. The user can register the content by specifying the product to be the issuance target, the condition of the consumer and the timing of the issuance. The content registered in the server device 100 is transmitted to the consumer terminal 200 when the issuance condition is satisfied (STEP 3).

In addition, the user can register the sales promotion information in the storage unit 130 corresponding to the product beforehand. When the consumer reads the product code in the consumer terminal 200 before purchasing the product, the read product code is transmitted to the server device 100. The code confirmation unit 1215 refers to the product DB 134, and specifies the product of the product code based on the received product code. In the case that the sales promotion information is registered for the specified product, the sales promotion information provision unit 1220 transmits the sales promotion information to the consumer terminal 200. The sales promotion information includes the advertisement of the product, the coupon and the evaluation information related to the product, or the like.

In the meantime, the user (company) can browse and retrieve the purchase information stored in the server device 100 (STEP 4). For example, by accessing the server device 100 and retrieving the purchase information and consumer attributes, a purchase rate from the consumers of what generation, sex and residential area or the like is high for the certain product can be analyzed. In addition, the user can individually execute a question or a questionnaire to a specific consumer extracted by retrieving the purchase information (STEP 5). For example, the user can individually send the question, the questionnaire, a message or the like related to the specific product to the consumers who have purchased the specific product.

Specifically, for example, the user can retrieve a kind of canned coffee that is popular among people in their twenties, a book sold well to people in their thirties living in Tokyo, a well-selling rice ball, tea sold most in convenience stores in Kanagawa prefecture yesterday, or the like. Then, the user who views the retrieval result can send questions to the pertinent consumers, and browse the comments and the photographs registered by the pertinent consumers. By browsing the photographs of the using scene of the product, the user can confirm an actual using method of the product and the situation at the time or the like. In addition, the user can also confirm the average value of evaluation values indicating the satisfaction degrees registered by the pertinent consumers. Further, the user can also retrieve the past purchase information of the other products for the pertinent consumers.

In addition, in order to motivate the consumer to register daily purchase, the purchase information utilization system 10 can impart rewards or have a game element. For example, the reward imparting unit 1219 imparts more rewards to the consumer questioned from more companies. In addition, the reward imparting unit 1219 may set a level to the consumer and raise the level when more purchase information is registered. The level may be determined in addition according to an elapsed period after the member registration, a using frequency of the purchase information utilization system 10, the evaluation from the other consumers, or the like. Also, the level of the consumer can be raised when the specific product is purchased in the 100th order for example. The reward imparting unit 1219 can determine the reward to be imparted according to the level of the consumer. In addition, by the rise of the level, the kinds of the prizes that the consumer can apply for increases and the kinds of the content issued from the user increases. Thus, the game element is added to the registration of the purchase information, and the consumer's motivation to register the purchase information can be increased.

In this way, in the purchase information utilization system 10, since the three of the product code, the receipt image and the shopping scene image are registered as described above when the purchase information is registered, the registration of the false purchase information by the consumer can be prevented. Specifically, by having the product code registered, the product purchased by the consumer can be specified on the side of the server device 100. Also, by having the receipt image registered, whether or not the purchased content and the purchase information registered by the consumer coincide can be investigated at any time on the side of the server device 100 so that the consumer is made to mentally hesitate to make a false report. Further, since an actual product is needed to register the shopping scene image, the consumer can be made to psychologically hesitate more and more and the false report can be prevented. Further, not only by the psychological hesitation but also by analyzing the receipt image and the shopping scene image, true/false of the registered purchase information can be confirmed.

Further as a mechanism for preventing the registration of the false purchase information, a function may be provided to divide the consumers registered with the purchase information utilization system 10 as the members into groups of several people each and have them monitor each other. Specifically, the arithmetic processing unit 121 classifies the consumers into groups to be periodically shuffled for example and allocates the group ID to each consumer. Then, the purchase information registered by the consumer having the same group ID is transmitted to the consumers, and the purchase information is confirmed at all times among the consumers. Thus, the purchase information can be monitored with each other within the group, and when incorrect purchase information is registered such as the case that it is registered that several hundreds of expensive products are simultaneously purchased, for example, the consumer can notify the reporting unit 1214. When the incorrect purchase information is notified, the reporting unit 1214 can confirm the group ID of the consumer who has notified, and when it coincides with the group ID of the consumer notified as the incorrect purchase, consider the purchase as being incorrect.

Next, individual processing flows in the individual steps described above, that is, the registration of the purchase information such as the product code, the support information, the using scene image and the evaluation information, browsing of the purchase information, and the request to the consumers, will be described in detail, respectively.

Figure 7:
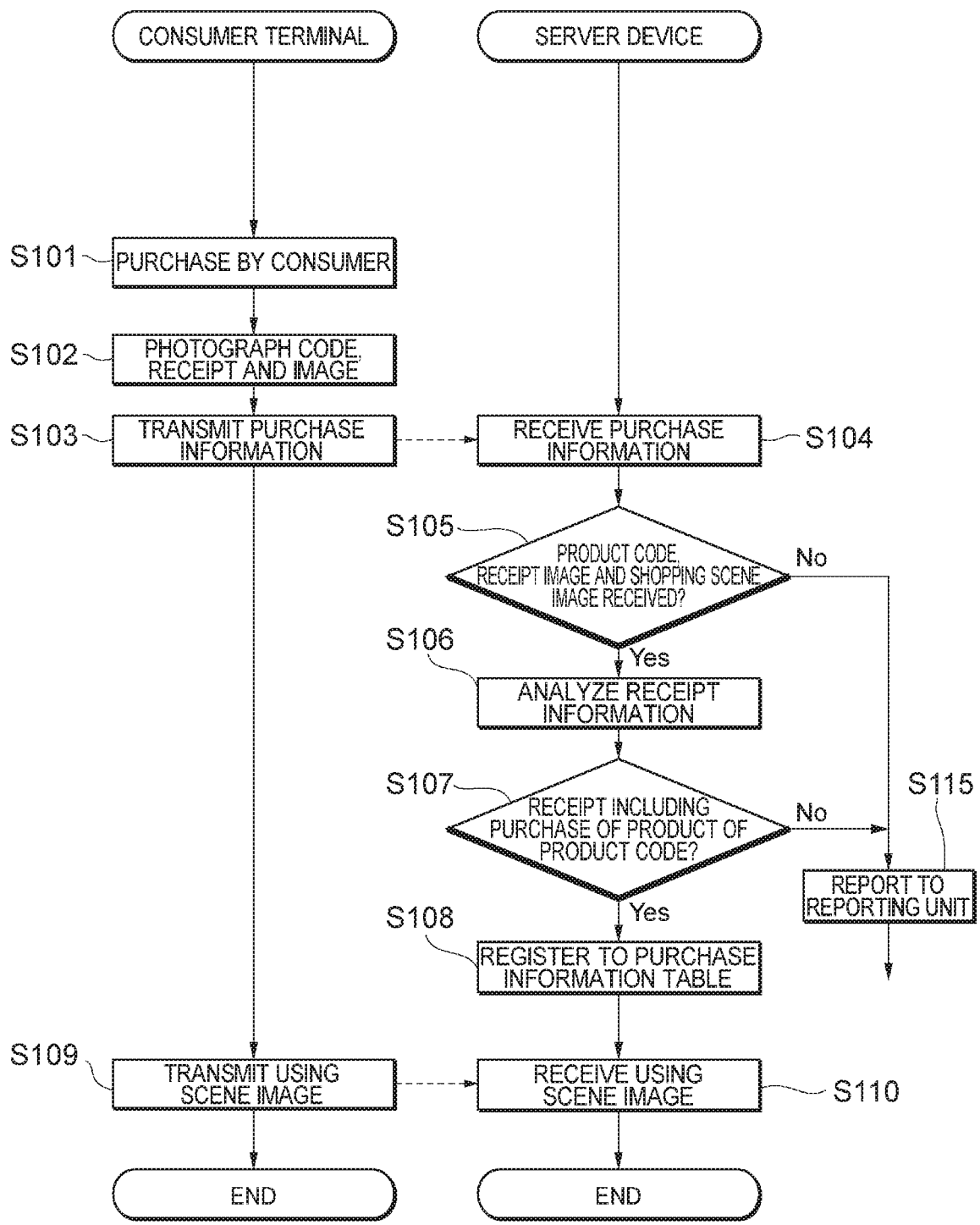
FIG. 7 is a flowchart illustrating a flow of purchase information registration processing in the first embodiment of the present invention.

First, the processing flow when registering the product code, the support information and the using scene illustrated in STEP 1 and STEP 2 in FIG. 6 will be described using FIG. 7.

The consumer can obtain the sales promotion information of the product before purchasing the product first. The consumer activates the photographing unit of the consumer terminal 200, photographs the product code, and transmits it to the server device 100. The code confirmation unit 1215 specifies the product from the received product code. According to the specified product, the sales promotion information provision unit 1220 provides the consumer terminal 200 with the sales promotion information such as the evaluation for the product prepared based on the purchase information stored in the purchase information table 133, and makes it be displayed at the display unit of the consumer terminal 200. The evaluation for the product can be provided by extracting the evaluation information of the other consumers from the purchase information table 133. For example, the well-selling ranking of the product can be displayed based on the purchase information, and the comment/satisfaction degree or the like from the other consumers can be displayed. In addition, the advertisement of the rival product can be also displayed.

When the product is actually purchased, the consumer registers the purchase information to the server device 100. Specifically, the consumer terminal 200 is operated and the photographing unit is activated. Then, the product code of the purchased product, the receipt and the shopping scene image including the image of the actual product are photographed. Then, the product code, the receipt image and the shopping scene image that are photographed are transmitted to the server device 100 as the purchase information (S103). When the purchase information is received (S104), the reception unit 1211 of the server device 100 determines whether or not three kinds of data of the product code, the receipt image and the shopping scene image are included in the received purchase information (S105). Then, when the three kinds of data are not included, the reception unit 1211 reports to the reporting unit 1214 that the received purchase information is incorrect data (S151).

By receiving the product code, the server device 100 can specify the product purchased by the consumer. In addition, by having the consumer transmit the image of the receipt and the image of the product, the consumer can be made to psychologically hesitate to register false purchase information. Note that, in the present embodiment, the three of the product code, the receipt image and the shopping scene image are essential as the purchase information, however, it is not limited thereto. For example, only two of the product code and the receipt image or the product code and the shopping image may be essential.

Next, the analysis unit 1213 reads text data as the receipt information from the receipt image. The receipt information may be extracted from the receipt image on the side of the consumer terminal 200 and transmitted to the server device 100. The analysis unit 1213 analyzes the receipt information (S106), predicts the product purchased by the consumer, and checks whether or not it coincides with the product corresponding to the product code (S107). When it does not coincide, the analysis unit 1213 notifies the reporting unit 1214 that the purchase information is the incorrect information (S151). On the other hand, when it coincides, the analysis unit 1213 notifies the reception unit 1211 of the coincidence, and the reception unit 1211 registers the received product code, receipt information and shopping scene image, and the information obtained by analyzing the receipt information to the purchase information table 133 (S108).

Next, the consumer registers the using scene image and the evaluation information when the purchased product is used to the purchase information table 133 in linkage with the product code. The consumer operates the consumer terminal 200, activates the photographing unit, and photographs an image with which the using situation of the product is recognized (S109). At the time, the consumer can also register the evaluation information such as the satisfaction degree for the product and the comment/impression or the like for the product as the purchase information. The using scene image and the evaluation information are received by the reception unit 1211, linked with the product code, and stored in the purchase information table 133.

In such a manner, in the purchase information utilization system 10, the registered using scene image and evaluation information are linked with the product code and stored as the purchase information. Thus, the purchase information utilization system 10 can store the information related to the daily life of the consumer. By storing the using scene image, the user can analyze the actual using mode and using situation of the product. For example, whether it is used alone or used by many people and after how much time it is used after the purchase or the like can be analyzed. In addition, since the user can transmit the content such as the questionnaire to the consumer after confirming the using scene image, the evaluation for the use of the product can be confirmed to the actual consumer in real time.

Figure 8:
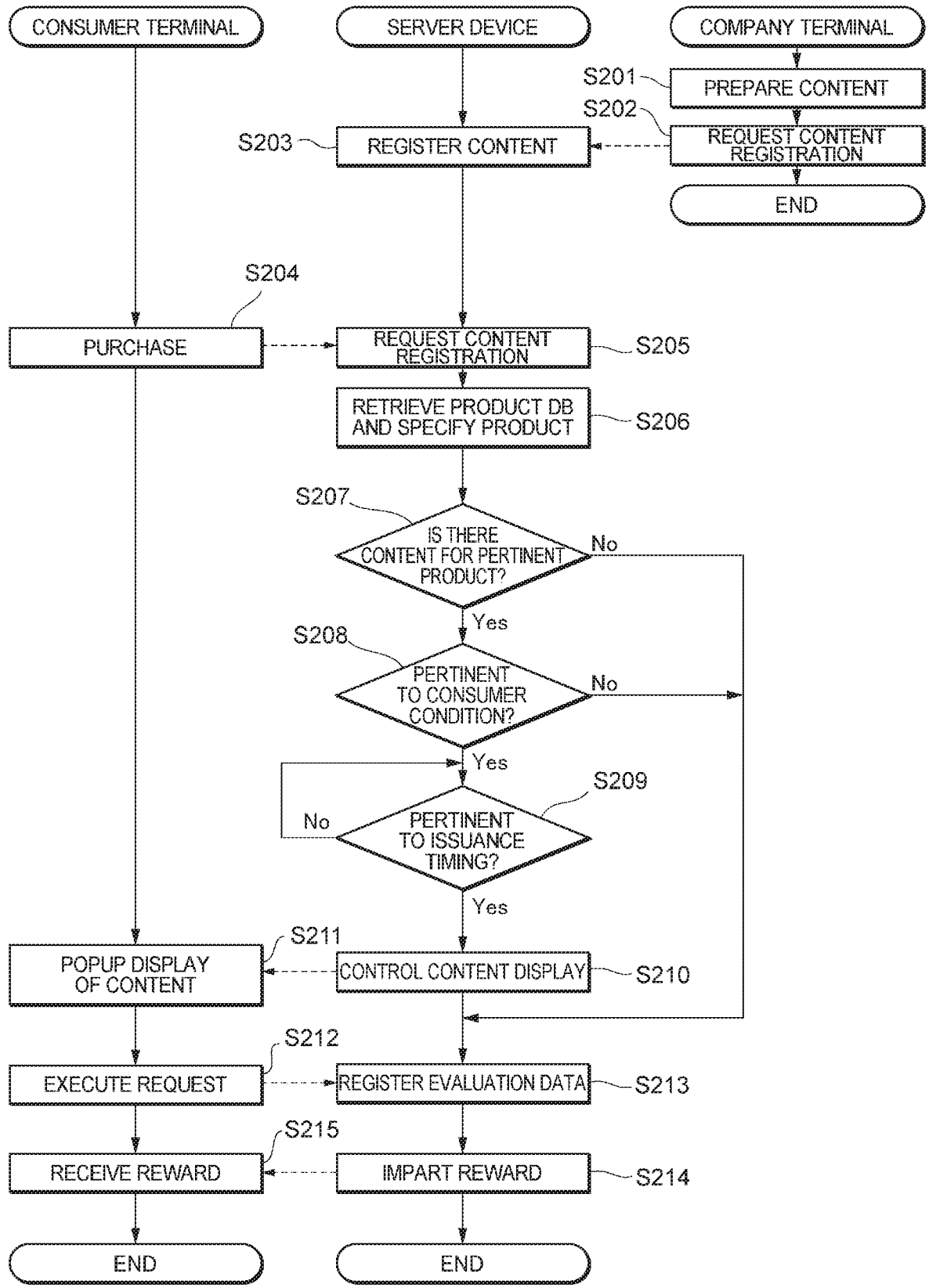
FIG. 8 is a flowchart illustrating a flow of content preparation processing in the first embodiment of the present invention.

Next, the processing flow when displaying the content at the consumer terminal 200 after the product purchase, illustrated in STEP 3 in FIG. 6 will be described using FIG. 8.

First, the user prepares the content and registers it in the server device 100. When newly preparing the content, the user prepares the content by operating the company terminal 300 and specifying the name of the content, the content, the condition of the consumer to be a target to transmit the content, and the issuance timing or the like (S201). The prepared content is received by the content preparation unit 1217 and registered to the content table 132 (S203).

The content includes, for example, the questionnaire, the coupon for the time of additionally purchasing other products, the evaluation for the specific product purchased by the consumer or the specific product used by the consumer, and the request of a monitoring investigation or the like, however, it is not limited thereto.

The consumer purchases the product (S204), the purchase information is transmitted to the server device 100, and the reception unit 1211 receives the purchase information (S205). Then, the true/false of the purchase information is confirmed by the processing of the reception unit 1211 and the analysis unit 1213 described above, and the purchase information is registered in the purchase information table 133. Next, the code confirmation unit 1215 refers to the product DB 134 for the registered product code, and specifies the corresponding product (S206). Then, the code confirmation unit 1215 refers to the content table 132, and confirms whether or not the content related to the specified product is registered (S207).

In the case that the content related to the specified product is registered in the content table 132, whether or not the consumer who has transmitted the product code is pertinent to the condition of the consumer such as the age and the level of the consumer registered in linkage with the content is determined (S208). When it is determined as being pertinent, the code confirmation unit 1215 further confirms the issuance timing (S209). For example, the issuance timing of the content issuance condition can be set to be the time of receiving the product code, the time of receiving the using scene image, or after the lapse of a predetermined period of time from the time of the reception or the like.

When the issuance timing is satisfied, the content provision unit 1216 performs control so as to make the consumer terminal 200 of the consumer display the content (S210). The issuance timing may be the one that the user can arbitrarily determine when preparing the content, or may be after the lapse of the predetermined period of time from the time of receiving the product code or the time of receiving the using scene image (the time of use), for example.

When the consumer responds to the questionnaire or purchases the other product based on the displayed content (S212), the reward imparting unit 1219 imparts rewards to the consumer terminal 200 (S214).

In this way, when many consumers register daily purchases to the server device 100 using the purchase information utilization system 10, the user can obtain the real evaluation of the specific product. In addition, since the consumer performs registration upon the actual purchase or use, the user can acquire the evaluation for the product from the consumer in real time by issuing the content.

Figure 9:
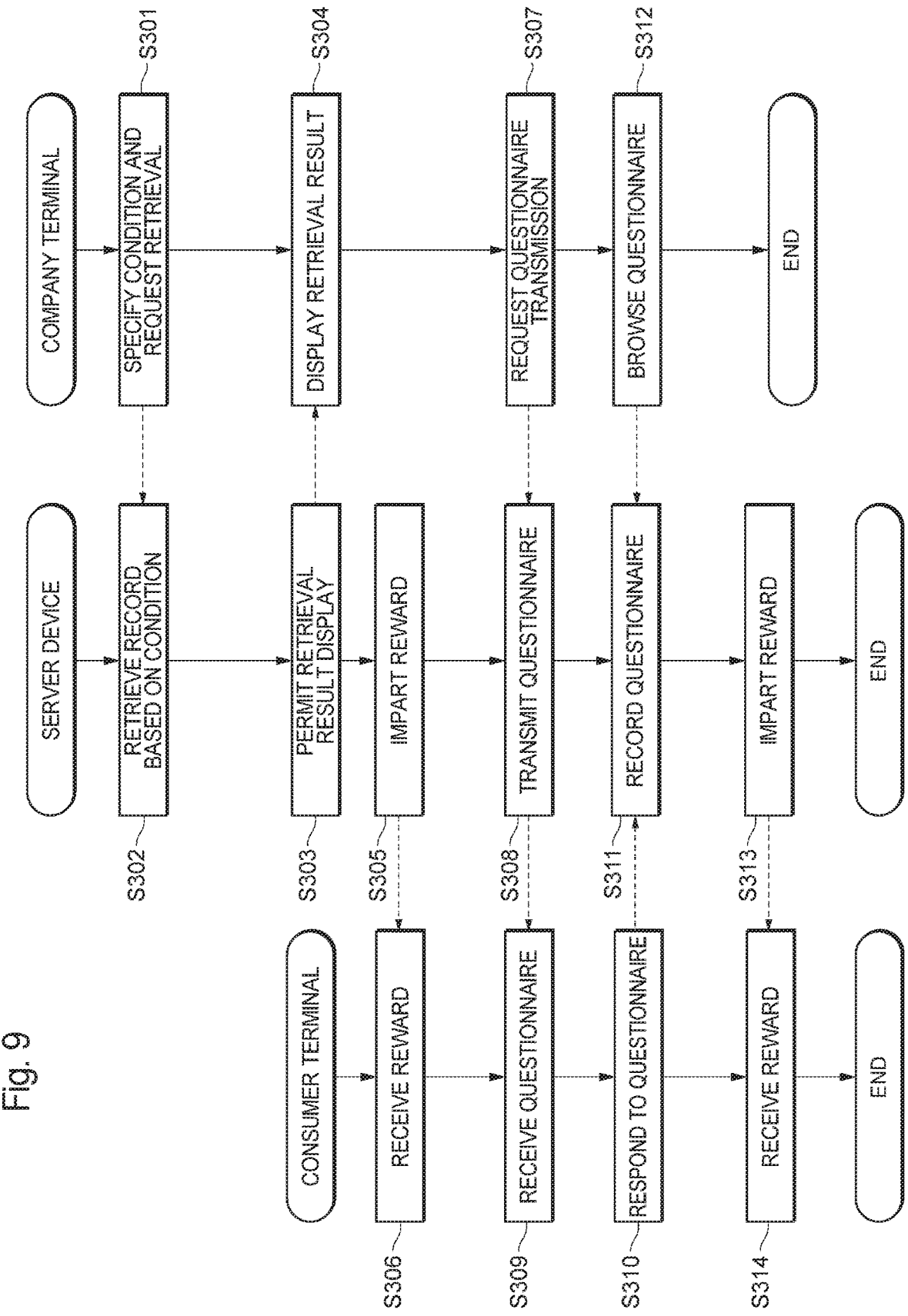
FIG. 9 is a flowchart illustrating a flow of purchase information browsing processing in the first embodiment of the present invention.

Next, the processing flow when the user browses the purchase information registered by the consumer and makes a predetermined request or the like to the consumer, illustrated in STEPs 4 and 5 in FIG. 6 will be described using FIG. 9.

The user of the company which sells and develops the product or the like can utilize the purchase information utilization system 10 when investigating the evaluation from the market of the product. First, the user can operate the company terminal 300, narrow down the products turned to the purchase target and the attributes of the consumer and perform retrieval. For example, narrowing-down can be performed from a maker, a code (such as the JAN code) and a category of the product. Category retrieval is a retrieval method of specifying a large classification (food, daily goods or the like), specifying a middle classification (curry, ramen or the like) further and performing narrowing-down. For example, the user can retrieve the purchase information registered by the consumer of a specific condition (the age, sex, occupation or the like) for a product A (S301). Note that narrowing-down from the maker or code of the product is one example. The user can narrow down, sum up and retrieve information in multiple aspects from all the purchase information stored in the system, specifically, the product code, the receipt information linked with it, the shopping scene image, the information of the consumer, the using scene image, and the evaluation information such as the satisfaction degree/comment or the like.

The retrieval unit 1218 receives a retrieval request from the company terminal 300, and narrows down the record pertinent to the condition from the purchase information table 133 based on the specified condition (S302). The company terminal 300 receives, as the retrieval result, the number of records of the purchase information, and the outline of the pertinent data.

By the retrieval result, the user can analyze the sex, generation, residential area or the like of a person who has purchased the product. In addition, the user can also select the record to confirm detailed evaluations from the received outline, and browse the detailed information of the evaluation and the using scene image or the like linked with the record. For example, by browsing the using scene image, the user can confirm how the consumer actually uses the purchased product and the situation at the time or the like. As a result of the retrieval, to the consumer turned to a retrieval target, the reward imparting unit 1219 imparts the reward (S305).

To the consumer turned to the target of the retrieval result, the user can request the question, the questionnaire or additional evaluations or request a monitoring investigation of a different product by performing retrieval under a different condition further or issuing the content (S307). For example, among the narrowed-down consumers, the consumers who have purchased three or more pieces of the product A in one week can be further narrowed down. The consumer can obtain the reward further (S314) by responding to the questionnaire (S310).

In such a manner, in the purchase information utilization system 10, the purchase information related to the purchase that the consumer has voluntarily performed is stored. By this, the user can obtain the information such as a kind of canned coffee that is popular among people in their twenties, a book sold well to people in their thirties living in Tokyo, a well-selling rice ball, tea sold most in convenience stores in Kanagawa prefecture yesterday, or the like. That is, based on a purchase action that the consumer has voluntarily taken, the information on when and where the consumer of what attribute has purchased what product is stored. Further, how it is used (for example, alone, by many people, how much time after the purchase, or the like), and what impressions are held can be recognized in real time at the timing of purchasing the product or the timing of using it. In addition, when issuing the content and requesting the monitoring investigation to the consumer, for example the user can select the consumer to be the target based on the purchase information that the consumer has voluntarily made, the market research based on the actual situation can be performed.

Further, in the purchase information utilization system 10, since all the stored data is browsed by the user, the reward is imparted to the consumer who has provided the browsed data so that the consumer can be made to provide data with high motivation.

Second Embodiment (Word-of-Mouth/Review Function)

The purchase information utilization system 10 relating to the present embodiment has a word-of-mouth/review function in addition to the functions described in the first embodiment. Word of mouth is the evaluation for the product by the consumer who has not purchased the product. On the other hand, the review is the evaluation for the product by the consumer who has actually purchased the product. In the present embodiment, in the consumer information table 131, the product code of "the product that the consumer is interested in" and the product code of "the product that the consumer wants to purchase" are linked with the consumer identifier and preserved.

Figure 10:
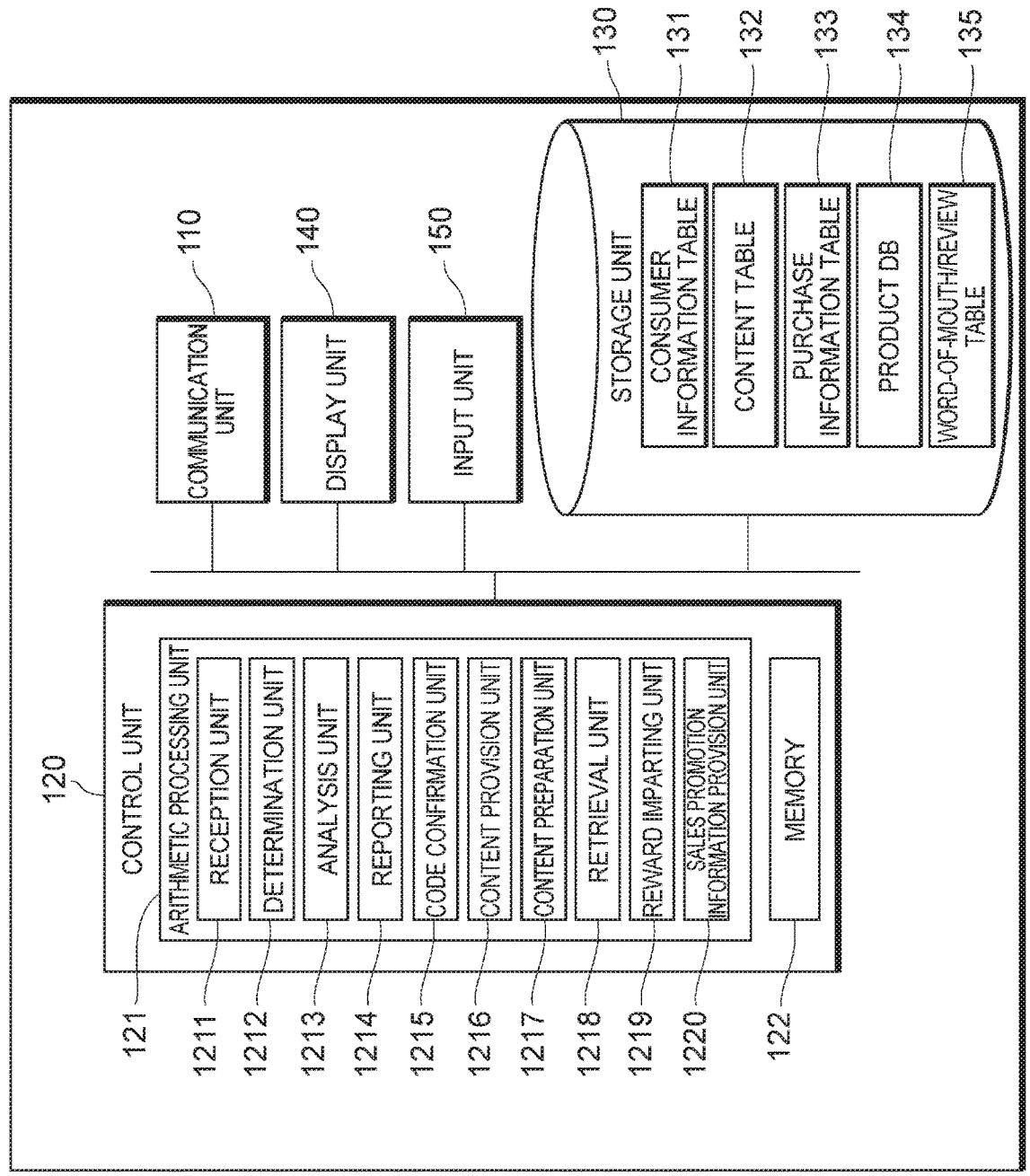
FIG. 10 is a configuration diagram of a purchase information utilization system in a second embodiment of the present invention.

FIG. 10 illustrates a system configuration diagram of the purchase information utilization system 10 relating to the present embodiment. As illustrated in FIG. 10, in the present embodiment, a word-of-mouth/review table 135 is preserved further in the storage unit 130. In the word-of-mouth/review table 135, for each product code, the word of mouth and the review are preserved in correspondence. In addition, in the word-of-mouth/review table 135, the evaluation information registered for each piece of purchase information in the purchase information table 133 may be preserved in correspondence for each product code, further. In this case, in the word-of-mouth/review table 135, it is desirable that, as the evaluation information, the information that can be digitized such as the satisfaction degree is preserved as the one for which the average value is calculated for each product code.

The reception unit 1211 relating to the present embodiment receives the word of mouth from the consumer who has not actually purchased the product, in addition to the functions described in the first embodiment. Also, the reception unit 1211 further receives the review from the consumer who has actually purchased the product. The reception unit 1211 can register the received word of mouth and review to the word-of-mouth/review table 135 corresponding to the product code.

The sales promotion information provision unit 1220 can prepare the sales promotion information based on the information of the word of mouth and the review registered to the word-of-mouth/review table 135 in addition to the functions described in the first embodiment. In addition, the sales promotion information provision unit 1220 may prepare a list of the products registered as the product that the consumer is interested in and the product that the consumer wants to purchase, and transmit it to the consumer terminal 200 further.

Figure 11:
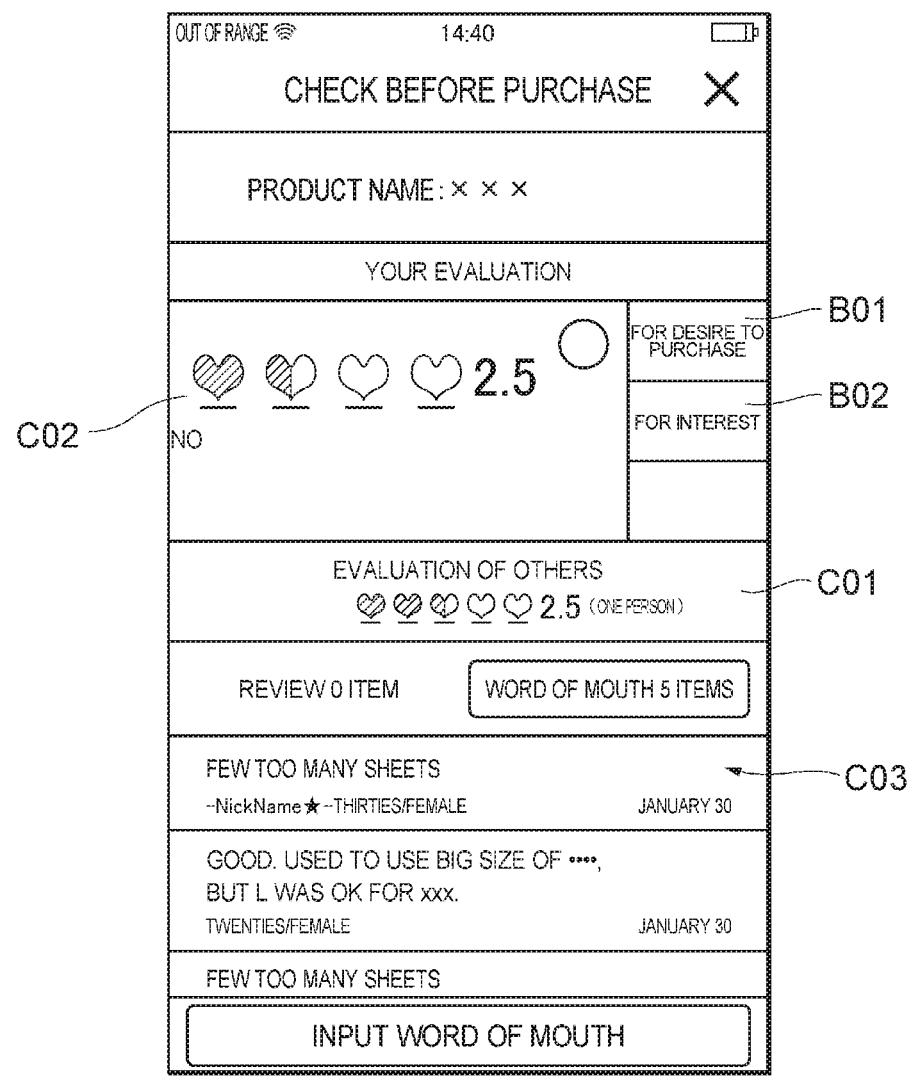

Specifically, when the consumer exposes the consumer terminal 200 to the product code of the product, a word-of-mouth/review screen illustrated in FIG. 11 is displayed on a screen of the consumer terminal 200. In FIG. 11, the word of mouth and the review related to a diaper named "xxx" are displayed. In an evaluation column C01, the satisfaction degree for the product "xxx" is displayed. Also, in an evaluation column C02, the satisfaction degree for the product "xxx" by the consumer who has exposed the product code is displayed. In addition, in a comment column CO3, the word of mouth and the review by the plurality of consumers are displayed. It is desirable that registration is performed to the consumer information table 131 in linkage with the consumer when the consumer presses a button B01 for a desire to purchase or a button B02 for interest on the right of the word-of-mouth/review screen.

Figure 12:
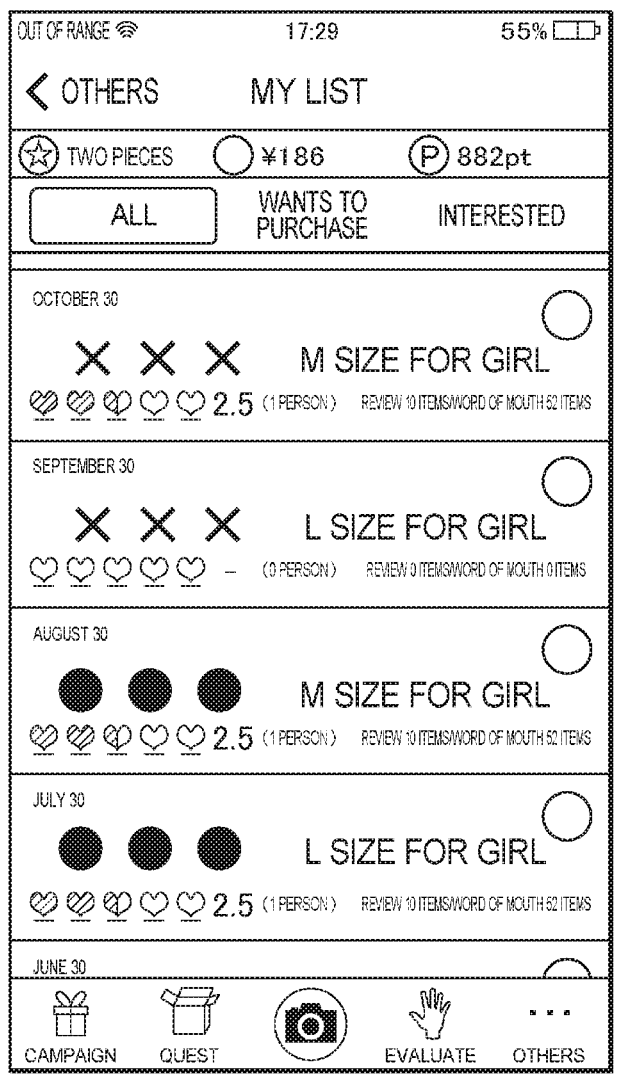
FIG. 12 is a diagram illustrating one example of a my-list screen in the second embodiment of the present invention.

FIG. 12 is a diagram illustrating one example of a my-list screen prepared by the sales promotion information provision unit 1220. The products for which the button B01 for a desire to purchase or the button B02 for interest is pressed on the word-of-mouth/review screen are listed and displayed on the my-list screen for each consumer. Thus, the consumer can store the products that the consumer is interested in after watching advertisements or commercials so as not to forget them. In addition, the user can perform more effective marketing by confirming the products registered in a my-list of the consumer.

The other configurations and functions are similar to those in the first embodiment.

Third Embodiment (Quest Confirmation Function/Level-Up Function)

The purchase information utilization system 10 relating to the present embodiment has, in addition to the functions described in the first embodiment, a quest confirmation function/level-up function.

A quest is a request of the monitoring investigation from the user to the consumer among the content described above. For example, the quest may be "to purchase a predetermined product and register the using scene image" or "to purchase a predetermined product and respond to the questionnaire" or the like. Note that, in the following description, completion of the request corresponding to the quest by the consumer is also referred to as "achieving the quest".

In the present embodiment, in the consumer information table 131, in addition to the consumer information, the consumer identifier, the level, the quest under execution and the completed quest are registered in correspondence. The level is used as an index for determining the quest that the consumer can execute or an amount of the reward to be given to the consumer or the like. In addition, in the purchase information table 133, it is desirable to record the date and time of the purchase when the product is purchased further in addition to the purchase information and the evaluation information. The date and time of the purchase may be the date and time when the product is actually purchased, other than the date and time when the consumer registers the purchase information to the purchase information table 133. In this case, the analysis unit 1213 may extract the receipt information which is the text data of the receipt from the receipt image received by the reception unit 1211, and analyze the date and time when the product is actually purchased.

The user can register the quest of the product for which the user wants to execute the monitoring investigation to the content table 132. In addition, the consumer can select the quest that the consumer wants to execute from the quests registered in the content table 132, and register it in the consumer information table 131.

The reception unit 1211 has a function of making the consumer terminal 200 display whether or not the product corresponding to the product code is the target of the quest being executed by the consumer, when the consumer reads the product code in the consumer terminal 200, in addition to the functions described in the first embodiment. Specifically, the reception unit 1211 refers to the consumer information table 131, and confirms the quest corresponding to the consumer who has read the product code. Then, the reception unit 1211 makes the consumer terminal 200 display whether or not the target product of the corresponding quest and the product whose product code is read coincide. Thus, the consumer can be prevented from erroneously purchasing a product different from the target of the quest.

The reward imparting unit 1219 has a function of setting an initial value (for example, a level 1) of the level to the consumer and varying the set level according to an action related to the purchase by the consumer, in addition to the functions described in the first embodiment. For example, the reward imparting unit 1219 has a function of varying the level so as to raise the level when the consumer registers more purchase information and to lower the level when the registration number of the purchase information in a fixed period is smaller than a predetermined value. In addition, the reward imparting unit 1219 may vary the level according to the elapsed period after the member registration, the using frequency of the purchase information utilization system 10, the evaluation from the other consumers, or the like. Also, the reward imparting unit 1219 can vary the level of the consumer when the consumer purchases the specific product in the 100th order or the like for example. The reward imparting unit 1219 can determine the reward to be imparted according to the level of the consumer. In addition, by the rise of the level, the kinds of the prizes that the consumer can apply for increases and the kinds of the content issued from the user increases. Thus, the game element is added to the registration of the purchase information, and the consumer's motivation to register the purchase information can be increased.

The content provision unit 1216 has a function of transmitting the quest according to the level of the consumer to the consumer terminal 200 (hereinafter, the transmission of a new quest to the consumer terminal 200 is also referred to as "the quest is generated", in addition to the functions described in the first embodiment. For example, the content provision unit 1216 may select the consumer to generate the quest based on a generation frequency of the action related to the purchase of the consumer. Specifically, the content provision unit 1216 can refer to the date and time of the purchase recorded in the purchase information table 133, select the consumer continuously taking the purchase action and generate the quest. In addition, the quest may be generated for the consumer who has not taken the purchase action for a long period of time for example.

It is desirable that the quest is generated when the consumer registers the support information (the receipt image and the shopping scene image) or when the consumer registers the using scene image. When the consumer achieves the quest, it is added to the completed quest of the record of the consumer in the consumer information table 131.

Note that, as described in the second embodiment, in the case that the product code of "the product that the consumer is interested in" and the product code of "the product that the consumer wants to purchase" are preserved in the consumer information table 131, the content provision unit 1216 can generate the quest related to the product that the consumer is interested in or the product that the consumer wants to purchase, which is registered by the consumer.

The other configurations and functions are similar to those in the first embodiment.

Fourth Embodiment (Household Account Book Function)

The purchase information utilization system 10 relating to the present embodiment has a household account book preparation function, in addition to the functions described in the first embodiment.

In the present embodiment, it is desirable that the date and time of the purchase when the product is purchased is recorded further in addition to the purchase information and the evaluation information in the purchase information table 133. The date and time of the purchase may be the date and time when the product is actually purchased, other than the date and time when the consumer registers the purchase information to the purchase information table 133. In this case, the analysis unit 1213 may extract the receipt information which is the text data of the receipt from the receipt image received by the reception unit 1211, and analyze the date and time when the product is actually purchased.

Figure 13:
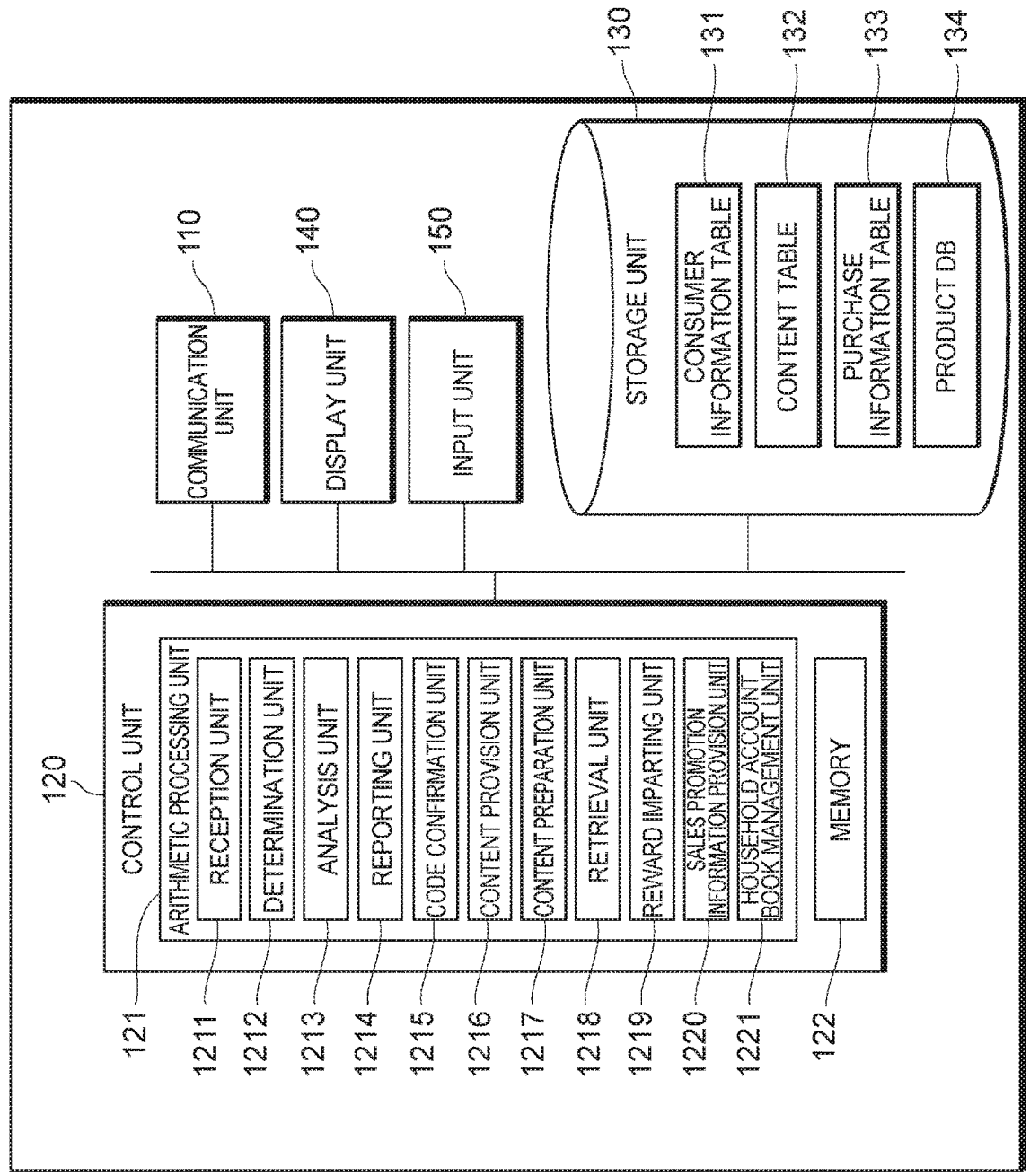
FIG. 13 is a configuration diagram of a purchase information utilization system in a fourth embodiment of the present invention.

FIG. 13 is a diagram illustrating a configuration of the purchase information utilization system 10 relating to the present embodiment. In the present embodiment, the arithmetic processing unit 121 includes a household account book management unit 1221 further in addition to the reception unit 1211, the determination unit 1212, the analysis unit 1213, the reporting unit 1214, the code confirmation unit 1215, the content provision unit 1216, the content preparation unit 1217, the retrieval unit 1218, the reward imparting unit 1219, and the sales promotion information provision unit 1220, as functional units.

The household account book management unit 1221 has a function of preparing a household account book by calculating a total money amount of the product purchased by the consumer at least on a daily basis, a weekly basis, a monthly basis or a yearly basis based on the purchase information stored in the purchase information table 133 and displaying the total money amount on a calendar.

Figure 14:
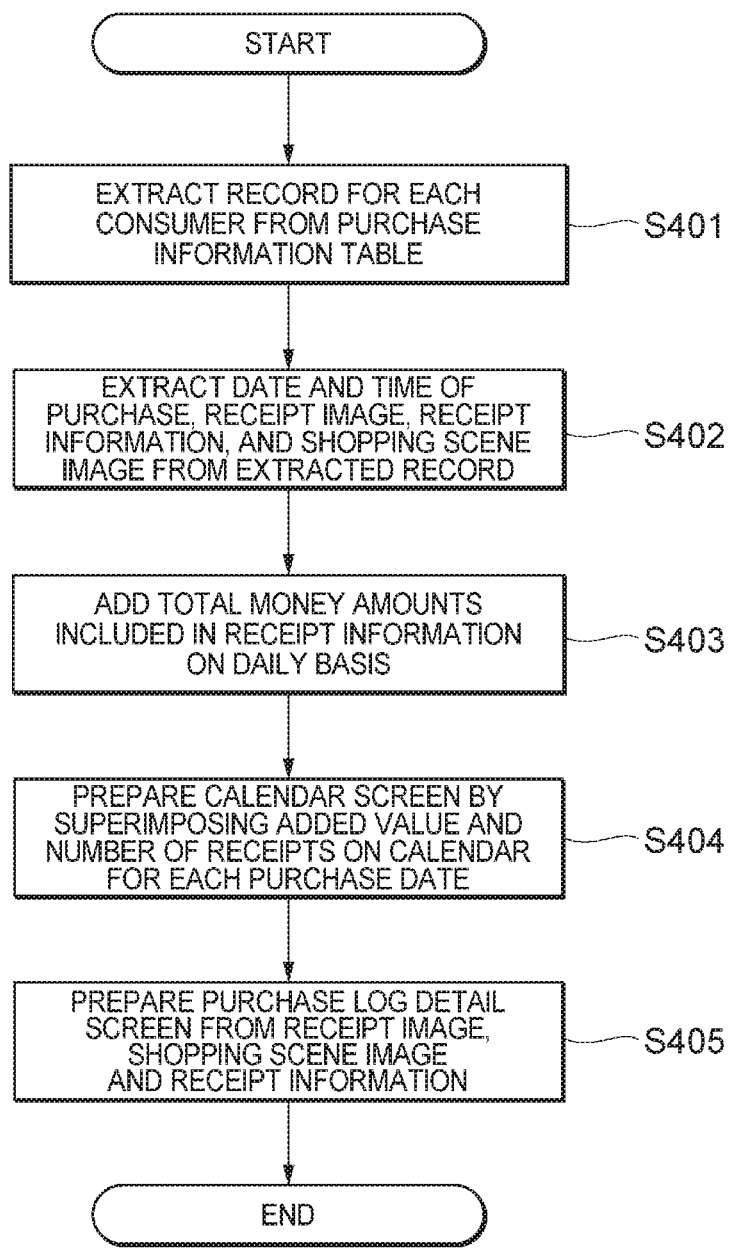
FIG. 14 is a chart illustrating a flow of household account book preparation processing of the purchase information utilization system in the fourth embodiment of the present invention.

Using FIG. 14, processing that the household account book management unit 1221 prepares the household account book on a daily basis will be described as one example. FIG. 14 is a flowchart illustrating a flow of household account book preparation processing in the household account book management unit 1221.

First, the household account book management unit 1221 extracts the record of each consumer from the purchase information table 133 (S401). Next, the household account book management unit 1221 extracts the date and time of the purchase, the receipt image, the receipt information, and the shopping scene image further from the extracted record (S402). The household account book management unit 1221 refers to the extracted date and time of the purchase, counts the number of the receipt information (or the receipt images) registered on each day, and adds the total money amount included in the receipt information on the daily basis (S403). The household account book management unit 1221 prepares a calendar screen by displaying the added value and the counted number of the receipt images on each date of the calendar (S404). At the time, it is desirable that the household account book management unit 1221 also calculates the total money amount of the purchase in each month by adding the added value for each month further.

Further, the household account book management unit 1221 prepares a purchase log detail screen from the receipt image, the shopping scene image and the receipt information (S405). It is desirable that the purchase log detail screen is a screen that displays the receipt image, the shopping scene image and the product name included in the receipt information, which are registered to each date.

Figure 15:
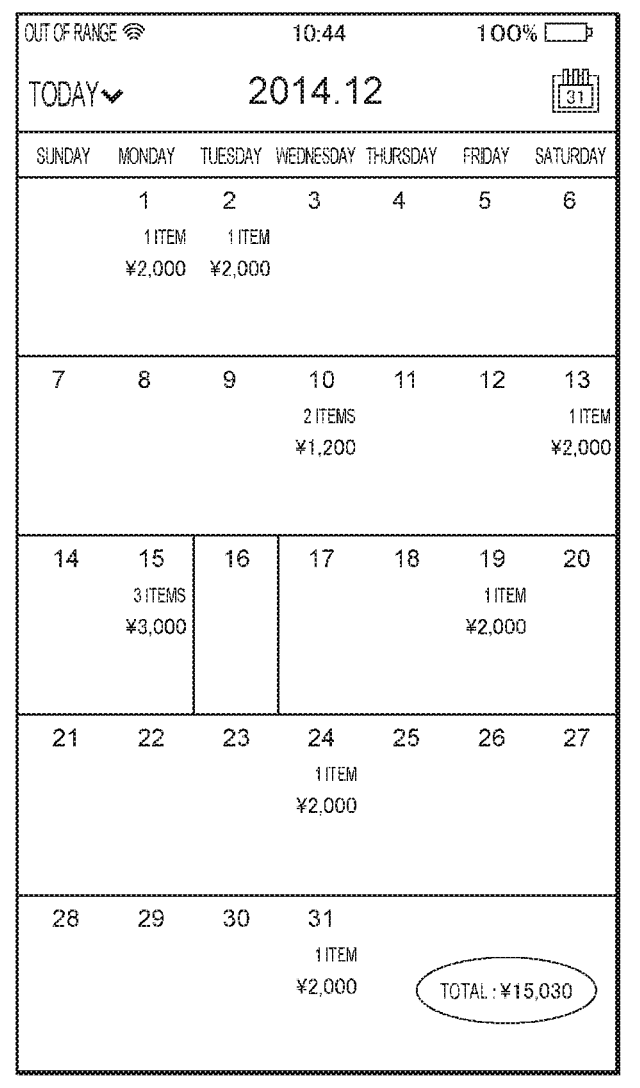
Figure 16:
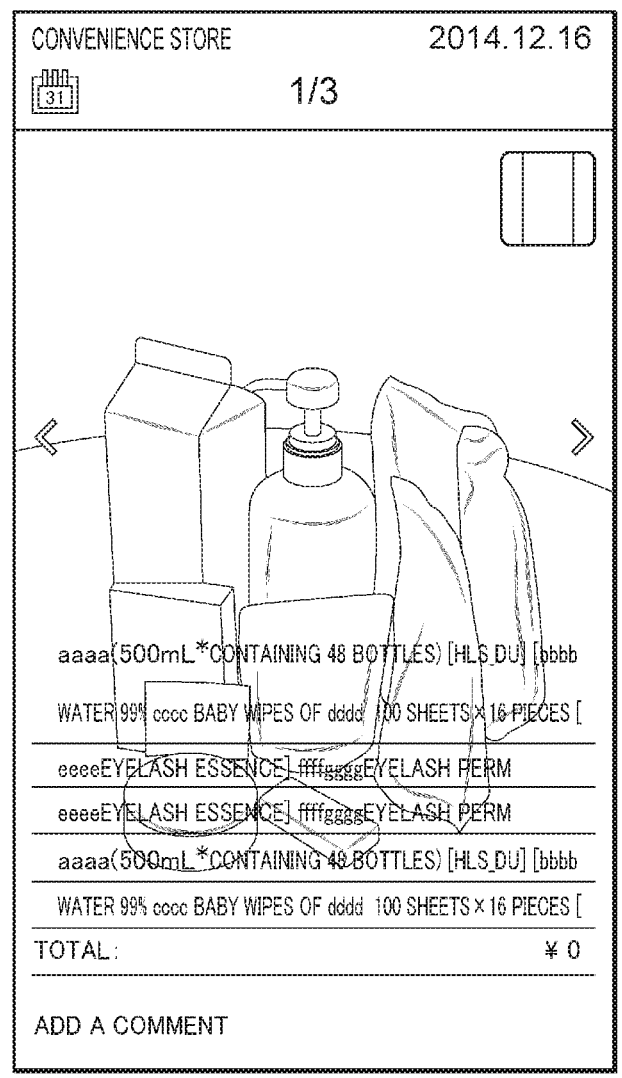
FIG. 16 is a diagram illustrating one example of a purchase log detail screen in the fourth embodiment of the present invention.

FIG. 15 is a diagram illustrating one example of a purchase calendar prepared by the household account book management unit 1221. In FIG. 15, the calendar of December, 2014 is displayed as an example. In a column corresponding to each date, the number of the registered receipts and the value for which the total money amounts of the receipts corresponding to each date are added are displayed. In addition, the total money amount of the purchase in each month, for which the added values are added further for each month, is displayed at the lower right. When the consumer selects an arbitrary date, the purchase log detail screen as illustrated in FIG. 16 is displayed. It is desirable that the name and money amount of the product purchased on the selected date, and the shopping image and the receipt image registered at the time are displayed on the purchase log detail screen.

Note that, for example, the consumer may be able to utilize the household account book function by photographing and registering a stub of a movie ticket or a ticket of a museum instead of a receipt. In this case, it is desirable that the reception unit 1211 registers the image of the photographed ticket or the like and the purchase money amount inputted by the consumer to the purchase information table 133.

In addition, the household account book management unit 1221 may retrieve a past purchase log. Specifically, when the consumer inputs a product name as a retrieval trigger, the household account book management unit 1221 extracts the record related to the consumer from the purchase information table 133. Next, the household account book management unit 1221 extracts the record including the product as the retrieval trigger further from the extracted record. The household account book management unit 1221 can refer to the date and time of the purchase registered in the record including the product as the retrieval trigger, and prepare a list screen of the purchase date of the product inputted as the retrieval trigger.

In addition, for example, when the consumer inputs the year, month and date of the purchase as the retrieval trigger, the household account book management unit 1221 first extracts the record related to the consumer from the purchase information table 133 similarly. Next, the household account book management unit 1221 extracts the record including the date and time of the purchase corresponding to the year, month and date of the purchase as the retrieval trigger further from the extracted record. Based on the receipt information and the image (shopping scene image/using scene image) registered in the extracted record including the date and time of the purchase corresponding to the year, month and date of the purchase as the retrieval trigger, the household account book management unit 1221 can make the consumer terminal 200 display the product name, the receipt image and the shopping scene image or the using scene image as the retrieval result.

Since the purchase information utilization system 10 relating to the present embodiment has the household account book function, the consumer can prepare a household account book with little time and labor. Thus, since the consumer is motivated to register the purchase information, collection of the purchase information is accelerated.

The other configurations and function are similar to those in the first embodiment.

Other Embodiments

The embodiments of the present invention are described above, however, the present invention is not limited to the already-described embodiments and various kinds of modifications and changes are possible based on the technical idea of the present invention.

For example, the purchase information utilization system 10 is described as the one that handles a single kind of the product code in the already-described embodiments, however, it is not limited thereto. For example, the purchase information utilization system 10 may be the one that handles not only a standardized product code but also an original code of a specific company or the like. In this case, the purchase information utilization system 10 can manage the original code of each company and the standardized product code for example in correspondence.

In addition, the purchase information utilization system 10 may be the one capable of collecting the purchase information of overseas consumers. In this case, the user can analyze overseas sales of not only Japanese products but also overseas products by performing retrieval in the purchase information utilization system 10.

Further, the purchase information utilization system 10 may be the one in which the data of the content such as the coupon or the advertisement is embedded beforehand in the product code, and when the consumer reads the code of the product in the consumer terminal 200 before the purchase, the content provision unit 1216 displays the content such as the advertisement at the consumer terminal 200.

REFERENCE SIGNS LIST 10 purchase information utilization system
100 server device
110 communication unit
120 control unit
121 arithmetic processing unit
1211 reception unit
1212 determination unit
1213 analysis unit
1214 reporting unit
1215 code confirmation unit
1216 content provision unit
1217 content preparation unit
1218 retrieval unit
1219 reward imparting unit
1220 sales promotion information provision unit
122 memory
130 storage unit
131 consumer information table
132 content table
133 purchase information table
134 product DB
140 display unit
150 input unit
200 consumer terminal
300 company terminal
400 network

The invention claimed is:

1. A purchase information utilization system comprising a processor and a storage unit, the purchase information utilization system executing a program stored in the storage unit to implement:
a reception unit that receives, from a terminal device of a consumer, purchase information including a product code, being product identification information obtained through photographing a product code displayed on a product by the terminal device, and a receipt image photographed by the terminal device;
a purchase information storage unit that stores the purchase information received by the reception unit;
a content storage unit that stores the identification information of the product, content related to the product and an issuance condition including an issuance timing of the content in correspondence; and
a determination unit that, when the reception unit receives information including the product code and the receipt image as the purchase information, determines that the consumer has purchased the product corresponding to the product code; and
a content provision unit that, when the determination unit determines that the consumer has purchased the product, refers to the content storage unit and, in a case that content corresponding to the product has been registered, allows the content to be transmitted to the terminal device based on the issuance timing,
wherein the content is at least any of an evaluation request for the product, a questionnaire and a coupon, and
wherein the issuance timing is a time when a predetermined period of time has elapsed from the time when the reception unit received the product code or a time when a predetermined period of time has elapsed from the time when the reception unit received an image of the product.

2. The purchase information utilization system according to claim 1, further comprising:
addition means that, when the reception unit receives information such as an image related to the product, a comment on the product, or an evaluation of the product from the terminal device of the consumer, adds the received information to the purchase information of the product by the consumer stored in the purchase information storage unit, and stores the received information.

3. The purchase information utilization system according to claim 1, wherein the content provision unit receives the identification information from the terminal device of the consumer, and provides the terminal device of the consumer with sales promotion information corresponding to the received identification information.

4. The purchase information utilization system according to claim 1, wherein:
the purchase information received by the reception unit further includes a shopping scene image including an image of the product purchased by the consumer; and
the determination unit determines, when the reception unit receives information including all of the product code, the receipt image and the shopping scene image as the purchase information, that the consumer has purchased the product corresponding to the product code.

5. An information processing method executed by a computer, the method comprising:
receiving, by a communication unit, purchase information from a terminal device of a consumer, the purchase information including a product code, being product identification information obtained through photographing a product code displayed on a product by the terminal device, and a receipt image photographed by the terminal device;
storing the purchase information received by the communication unit in a storage unit;
storing, in the storage unit, the identification information of the product, content related to the product and an issuance condition including an issuance timing of the content in correspondence; and determining, by a control unit, that the consumer has purchased the product corresponding to the product code when the communication unit receives information including the product code and the receipt image as the purchase information; and referring to, when it is determined that the consumer has purchased the product, the storage unit and, in a case that content corresponding to the product has been registered, allowing the control unit to provide the terminal device with the content based on the issuance timing, wherein the content is at least any of an evaluation request for the product, a questionnaire and a coupon, and wherein the issuance timing is a time when a predetermined period of time has elapsed from the time when the communication unit received the product code or a time when a predetermined period of time has elapsed from the time when the communication unit received an image of the product.

6. A non-transitory computer-readable storage medium that stores a program for causing a computer to execute an information processing method, the method comprising:

receiving, by a communication unit, purchase information from a terminal device of a consumer, the purchase information including a product code, being product identification information obtained through photographing a product code displayed on a product by the terminal device, and a receipt image photographed by the terminal device;

storing the purchase information received by the communication unit in a storage unit;

storing, in the storage unit, the identification information of the product, content related to the product and an issuance condition including an issuance timing of the content in correspondence; and determining, by a control unit, that the consumer has purchased the product corresponding to the product code when the communication unit receives information including the product code and the receipt image as the purchase information; and referring to, when it is determined that the consumer has purchased the product, the storage unit and, in a case that content corresponding to the product has been registered, allowing the control unit to provide the terminal device with the content based on the issuance timing, wherein the content is at least any of an evaluation request for the product, a questionnaire and a coupon, and wherein the issuance timing is a time when a predetermined period of time has elapsed from the time when the communication unit received the product code or a time when a predetermined period of time has elapsed from the time when the communication unit received an image of the product.

* * * * *